United States Patent
Du et al.

(10) Patent No.: US 12,292,067 B2
(45) Date of Patent: May 6, 2025

(54) TURBINE ENGINE AIR INTAKE SYSTEM AND CABIN

(71) Applicant: YANTAI JEREH PETROLEUM EQUIPMENT & TECHNOLOGIES CO., LTD., Shandong (CN)

(72) Inventors: Junlong Du, Shandong (CN); Rikui Zhang, Shandong (CN); Xiaolei Ji, Shandong (CN); Peng Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/900,242

(22) Filed: Aug. 31, 2022

(65) Prior Publication Data

US 2023/0003238 A1    Jan. 5, 2023

Related U.S. Application Data

(63) Continuation-in-part of application No. 17/170,135, filed on Feb. 8, 2021, now Pat. No. 11,603,797, and
(Continued)

(30) Foreign Application Priority Data

Sep. 6, 2019   (CN) .......................... 201910843129.1
Nov. 23, 2020   (CN) .......................... 202022735271.5
Apr. 1, 2022   (CN) .......................... 202210339439.1

(51) Int. Cl.
*F16B 2/02*    (2006.01)
*F16B 2/18*    (2006.01)

(52) U.S. Cl.
CPC ................ *F16B 2/02* (2013.01); *F16B 2/185* (2013.01)

(58) Field of Classification Search
CPC ... F16B 2/02; F16B 2/185; B25B 1/14; E05C 19/14
See application file for complete search history.

(56) References Cited

U.S. PATENT DOCUMENTS 4,050,913 A    9/1977   Roach
5,165,148 A *  11/1992  Fleischer .................. B25B 5/12
                                             292/113
(Continued)

FOREIGN PATENT DOCUMENTS

CN    101713335 A    5/2010
CN    201530452 U    7/2010
(Continued)

OTHER PUBLICATIONS

Office Action dated Jan. 17, 2023 for Chinese Patent Application No. 2022103394391; 2 pages.
(Continued)

*Primary Examiner* — Kyle A Cook
(74) *Attorney, Agent, or Firm* — Crowell & Moring LLP

(57) ABSTRACT

This disclosure provided is a connecting structure for connecting a first workpiece to a second workpiece. The connecting structure includes: a first connecting assembly disposed on the first workpiece; a second connecting assembly disposed on the second workpiece, wherein the second connecting assembly includes a second connecting member and a fixing assembly, the second connecting member is movably disposed, so as to connect the second connecting member and the first connecting assembly; the fixing assembly is connected with the second connecting member, and the fixing assembly is movably disposed relative to the second connecting member; and a locking portion, wherein
(Continued)

at least part of the locking portion is disposed on the second workpiece, and the fixing assembly is connected with the locking portion.

8 Claims, 20 Drawing Sheets

Related U.S. Application Data a continuation-in-part of application No. 16/832,214, filed on Mar. 27, 2020, now Pat. No. 11,441,483.

(56) References Cited

U.S. PATENT DOCUMENTS

| | | | |
|---|---|---|---|
| 6,134,878 A | | 10/2000 | Amako et al. |
| 7,213,848 B2* | | 5/2007 | Hagan ............... E05C 19/14 |
| | | | 24/494 |
| 8,048,186 B2 | | 11/2011 | Mann et al. |
| 8,123,205 B2* | | 2/2012 | Martin ............... B25B 5/16 |
| | | | 269/201 |
| 10,092,870 B2 | | 10/2018 | Sweet et al. |
| 10,895,202 B1 | | 1/2021 | Yeung et al. |
| 2002/0153733 A1* | | 10/2002 | Fuchs ............... F16B 2/185 |
| | | | 292/195 |
| 2006/0163885 A1* | | 7/2006 | Eriksson ............ F16B 2/185 |
| | | | 292/247 |
| 2010/0077754 A1 | | 4/2010 | Jangili |
| 2010/0181710 A1* | | 7/2010 | Martin ............... E05C 19/14 |
| | | | 269/6 |
| 2011/0162383 A1 | | 7/2011 | Zhang et al. |
| 2014/0020394 A1 | | 1/2014 | Laing et al. |
| 2014/0130422 A1 | | 5/2014 | Laing et al. |
| 2015/0322859 A1 | | 11/2015 | Van Den Bossche et al. |
| 2016/0032703 A1 | | 2/2016 | Broussard et al. |
| 2016/0248230 A1 | | 8/2016 | Tawy et al. |
| 2017/0009654 A1 | | 1/2017 | Maier |
| 2017/0292409 A1 | | 10/2017 | Aguilar et al. |
| 2017/0342752 A1* | | 11/2017 | Quam ............... E05C 19/184 |
| 2018/0030895 A1 | | 2/2018 | Laing et al. |
| 2018/0195435 A1 | | 7/2018 | Zhang et al. |
| 2018/0221801 A1 | | 8/2018 | Eyers et al. |
| 2019/0068026 A1 | | 2/2019 | Davis |
| 2019/0295520 A1 | | 9/2019 | Johnson et al. |
| 2021/0046415 A1 | | 2/2021 | Tiffany et al. |
| 2021/0071579 A1 | | 3/2021 | Li et al. |
| 2022/0162991 A1 | | 5/2022 | Zhang et al. |

FOREIGN PATENT DOCUMENTS

| | | | | |
|---|---|---|---|---|
| CN | 101858254 A | 10/2010 | | |
| CN | 101910567 A | 12/2010 | | |
| CN | 201963435 U | 9/2011 | | |
| CN | 205047308 U | 2/2016 | | |
| CN | 205578120 U | 9/2016 | | |
| CN | 106499507 A | 3/2017 | | |
| CN | 109533641 A | 3/2019 | | |
| CN | 109578142 A | 4/2019 | | |
| CN | 110454285 A | 11/2019 | | |
| CN | 110485983 A | 11/2019 | | |
| CN | 111803820 A | 10/2020 | | |
| CN | 211819660 U | 10/2020 | | |
| CN | 214064497 U | 8/2021 | | |
| DE | 102008017447 A1 * | 10/2009 | ............ | F16B 2/185 |
| JP | 2001279959 A | 10/2001 | | |

OTHER PUBLICATIONS

James DiCampli, Jack Pan, and Mark Arsenault, Gas Turbine Air Filter System Optimization, Jan. 21, 2015, https:// www.power-eng.com/emissions/pol icy-regulations/gas-turbi ne-air-fi lter-system-opti mization/#gref (Year: 2015).

Brentwood Industries, Cooling Tower Drift vs. Splashout, Oct. 1, 2015, https://www.brentwoodindustries.com/resources/ learning-center/cooling-tower/cooling-tower-drift-vs-splash-out/ (Year: 2015).

International Search Report dated on Jun. 11, 2020, corresponding PCT/CN2019/104716, with English translation, 6 pages.

Written Opinion dated on Jun. 11, 2020, corresponding PCT/CN2019/104716, 4 pages.

Brentwood.com, Drift Eliminator Supports, retrieved via Wayback machine archive, catalogued Sep. 28, 2020 (Year: 2020)

International Search Report mailed Jul. 28, 2021 for International Application No. PCT/CN2020/137106.

* cited by examiner

A of FIG. 10

TURBINE ENGINE AIR INTAKE SYSTEM AND CABIN

CROSS-REFERENCE TO RELATED APPLICATIONS

The present application is based on and claims the benefit of priority to Chinese Patent Application No. 202210339439.1 filed on Apr. 1, 2022 and entitled "Connecting Structure". The present application is further a continuation-in-part application and claims the benefit of priority to U.S. patent application Ser. No. 16/832,214, filed on Mar. 27, 2020 and entitled "Soundproof Cabin of Turbine Engine," which is based on Chinese Patent Application No. 201910843129.1, filed on Sep. 6, 2019. The present application is further a continuation-in-part application and claims the benefit of priority to U.S. patent application Ser. No. 17/170,135, filed on Feb. 8, 2021 and entitled "Compartment Unit for Turbine Engine", which is based on and claims the benefit of priority to Chinses Patent Application No. 202022735271.5 filed on Nov. 23, 2020. These prior patent applications are hereby incorporated by reference in their entireties.

TECHNICAL FIELD

The disclosure relates to air intake systems of turbine engines.

BACKGROUND

Compared with traditional diesel engines, turbine engines have the advantages of higher single-machine power density and lower construction cost with natural gas as fuel. Therefore, turbine engines have been widely used in oil field fracturing equipment at present.

Due to requirements of a large quantity of clean intake air and low air intake resistance, a turbine engine is configured with an air intake system that includes a plurality of large-sized filter elements and an air pre-filter or an inertial separator. In an installation process, on account of large sizes of the air intake system and the turbine engine, disassembly and assembly between the air intake system and the turbine engine are complicated and labor intensive, and it is difficult to clean or replace filter elements and other components in the air intake system.

SUMMARY

The main objective of the disclosure is to provide a connecting structure, so as to solve problems of complex disassembly and assembly between a turbine engine and an air pre-filter or an inertial separator in the prior art.

Some embodiments of the disclosure provide a connecting structure being configured to connect a first workpiece and a second workpiece. The connecting structure includes: a first connecting assembly disposed on the first workpiece; a second connecting assembly disposed on the second workpiece, wherein the second connecting assembly includes a second connecting member and a fixing assembly, the second connecting member is movably disposed, so as to connect the second connecting member and the first connecting assembly, the fixing assembly is connected with the second connecting member, and the fixing assembly is movably disposed relative to the second connecting member; and a locking portion, wherein at least part thereof is disposed on the second workpiece, and the fixing assembly is connected with the locking portion.

In some embodiments, the second connecting member is rotatably disposed around a first predetermined axis; the fixing assembly is rotatably disposed around a second predetermined axis relative to the second connecting member; and the first predetermined axis and the second predetermined axis are staggered.

In some embodiments, the first connecting assembly includes a connecting plate, and a hook portion is disposed on the connecting plate. The second connecting member includes a hanging ring, the hanging ring is connected with the fixing assembly, the fixing assembly is configured to drive the hanging ring to move in a direction close to the first workpiece, the hanging ring is rotatably disposed around the first predetermined axis, and at least part of the hanging ring is hung in the hook portion.

In some embodiments, the second connecting assembly further includes: a fixed seat, wherein a protruding plate is disposed on the fixed seat, and the fixing assembly is hinged to the protruding plate; and a rotatable shaft, wherein the rotatable shaft is connected with the hanging ring, and the rotatable shaft is connected with the fixing assembly, the fixing assembly drives the hanging ring to move by means of the rotatable shaft, and the hanging ring rotates around an axis of the rotatable shaft.

In some embodiments, a first hinge point is provided on the protruding plate, and the first hinge point is close to the connecting plate relative to the axis of the rotatable shaft.

In some embodiments, the locking portion includes a clamping plate, the clamping plate is disposed on the fixed seat, and the clamping plate extends from the fixed seat in a direction away from the first workpiece. The fixing assembly includes: a rotatable handle hinged to the protruding plate and connected with the hanging ring, wherein the rotatable handle is configured to drive the hanging ring to move; and a locking handle, wherein the locking handle is hinged to the rotatable handle, a clamping groove is provided on the locking handle, and the locking handle is connected with the clamping plate in a clamped manner by means of the clamping groove.

In some embodiments, the second connecting assembly further includes: a hinge shaft, wherein the hinge shaft sequentially penetrates the rotatable handle and the locking handle, and the locking handle rotates around the hinge shaft; and a torsion spring sleeving the hinge shaft and positioned between the rotatable handle and the locking handle, wherein two ends of the torsion spring are connected with the rotatable handle and the locking handle respectively.

In some embodiments, a first step structure is disposed on the first workpiece, a second step structure is disposed on the second workpiece, and a first step end surface of the first step structure and a second step end surface of the second step structure are positioned on a same plane. The connecting structure further includes: a loading assembly disposed on the second step end surface, wherein the loading assembly is movably disposed in a direction close to or away from the first workpiece, and at least part of the loading assembly is in lap joint with the second step end surface.

In some embodiments, the loading assembly includes: a sleeve disposed on the second step end surface, wherein an opening is provided on a wall of the sleeve; a loading pin penetrating the sleeve and moving relative to the sleeve, wherein at least part of the loading pin is in lap joint with the second step end surface; and a limiting rod, wherein at least part of the limiting rod penetrates the opening to be connected with the loading pin, and the limiting rod is configured to drive the loading pin to move.

In some embodiments, the first connecting assembly includes a supporting shaft, the supporting shaft is rotatably disposed on the first workpiece around an axis of the supporting shaft, a penetration hole is provided on the supporting shaft, and an internal thread is disposed in the penetration hole. The second connecting member includes a pressing pull rod, an external thread is disposed on the pressing pull rod, the fixing assembly is configured to drive the pressing pull rod to rotate around the first predetermined axis, and the pressing pull rod is in threaded connection to the penetration hole.

In some embodiments, the fixing assembly includes: a rotatable pin, wherein a first through hole is provided at one end, away from the supporting shaft, of the pressing pull rod, the first through hole extends in a radial direction of the pressing pull rod, and at least part of the rotatable pin penetrates the first through hole; and a rotatable pressing plate, wherein a second through hole opposite the first through hole is provided on the rotatable pressing plate, the rotatable pin sequentially penetrates the second through hole and the first through hole, and the rotatable pressing plate rotates around the rotatable pin.

In some embodiments, the locking portion includes a lug plate, the lug plate is disposed on the second workpiece, and a first locking hole is provided on the lug plate. A second locking hole is provided on the rotatable pressing plate, and a push-pull pin is sequentially inserted into the first locking hole and the second locking hole, so as to fix the rotatable pressing plate at a locking position.

In some embodiments, the locking portion further includes a mounting plate, the mounting plate is disposed on the second workpiece, the lug plate is disposed on the mounting plate, a third through hole is provided on the mounting plate, and the pressing pull rod penetrates the third through hole and then penetrates the penetration hole. The first connecting assembly further includes: a supporting plate, wherein the supporting plate is disposed on the first workpiece, and the supporting shaft is disposed on the supporting plate.

In some embodiments, an eccentric cam is disposed at an end of the rotatable pressing plate, and the second through hole is provided on the eccentric cam.

By applying the technical solution of the disclosure, the connecting structure is configured to connect the first workpiece and the second workpiece, such that the first workpiece and the second workpiece are conveniently disassembled and assembled. The connecting structure includes: the first connecting assembly, the second connecting assembly and the locking portion. The first connecting assembly is disposed on the first workpiece. The second connecting assembly is disposed on the second workpiece, the second connecting assembly includes the second connecting member and the fixing assembly, the second connecting member is movably disposed, so as to connect the second connecting member and the first connecting assembly, the fixing disposed is connected with the second connecting member, and the fixing assembly is movably disposed relative to the second connecting member. At least part of the locking portion is disposed on the second workpiece, and the fixing assembly is connected with the locking portion. In this way, when the second connecting member and the first connecting assembly are connected, the fixing assembly is connected with the locking portion, so as to lock the second connecting member at a connecting position and prevent the first workpiece from being separated from the second workpiece. Moreover, when the first workpiece and the second workpiece are required to be disassembled, only the fixing assembly is required to be operated to separate the fixing assembly from the locking portion, and then the fixing assembly is operated to drive the second connecting member to move, so as to separate the second connecting member from the first connecting assembly, thereby disassembling the first workpiece and the second workpiece. The connecting structure is simple, operation is convenient, and connection stability when the first workpiece and the second workpiece are connected is improved.

BRIEF DESCRIPTION OF THE DRAWINGS

The accompanying drawings, forming part of the disclosure, of the description serve to provide a further understanding of the disclosure, and illustrative embodiments of the disclosure and the description of the illustrative embodiments serve to explain the disclosure and are not to be construed as unduly limiting the disclosure. In the accompanying drawings.

DETAILED DESCRIPTION OF THE EMBODIMENTS

Figure 1:
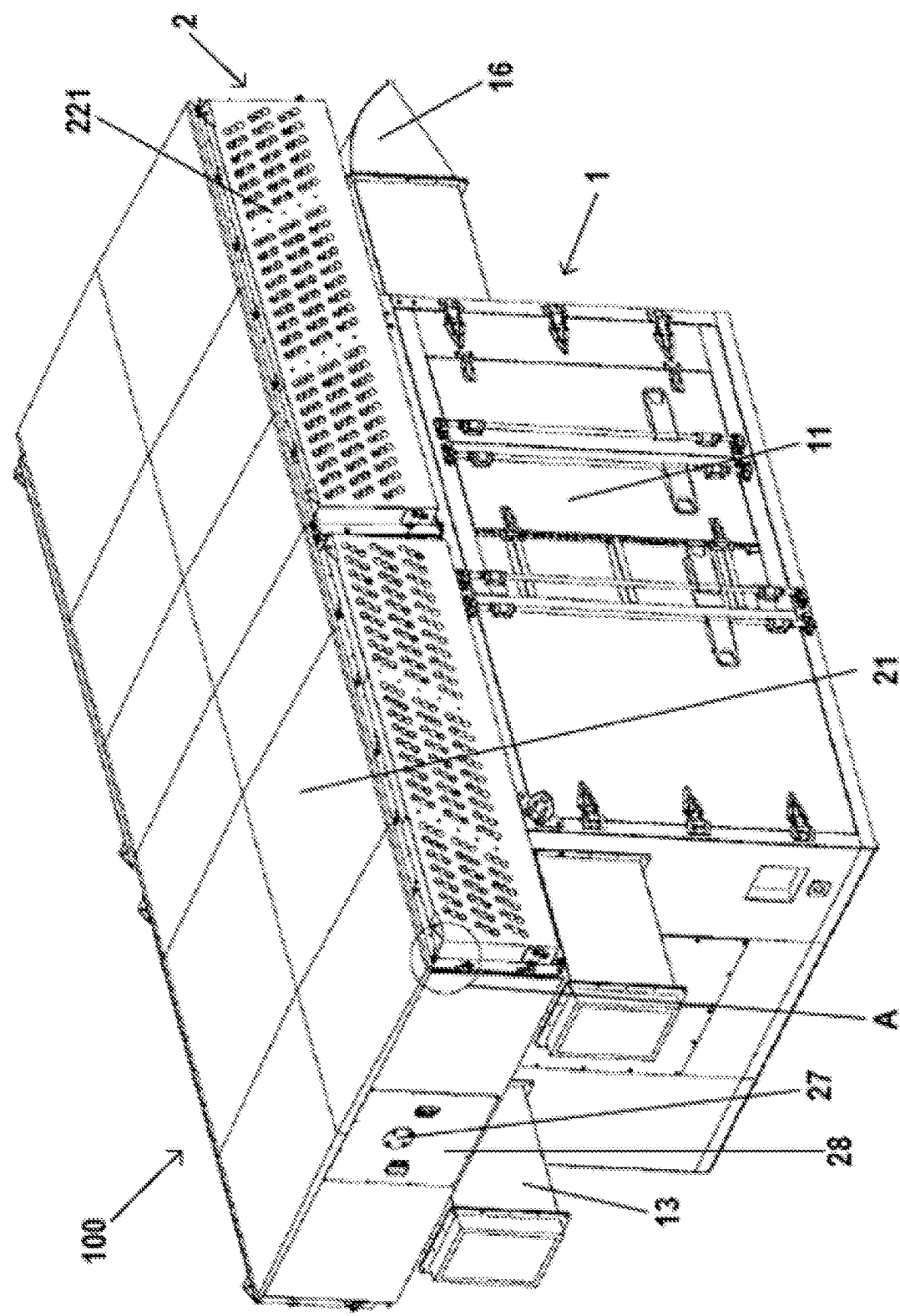
FIG. 1 shows a schematic view of an exterior of an example compartment unit for a turbine engine according to an embodiment of the present invention.

It should be noted that embodiments in a disclosure and features in the embodiments are combinable with one another if there is no conflict. The disclosure will be described in detail below with reference to the accompanying drawings and the embodiments.

It should be noted that terms used herein are merely for describing the specific implementations and are not intended to limit illustrative implementations according to the disclosure. As used herein, singular is also intended to include plural unless the context clearly points out singular or plural. In addition, it should be understood that terms "include" and/or "comprise", used in the description, indicate the presence of features, steps, operations, devices, assemblies and/or combinations of the foregoing. In the text herein, some features are described by precedent terms "first" and "second". Such description is only intended to facilitate distinguishing the features unless specified otherwise. Existence of "first" does not mean that "second" certainly exists Referring first to FIG. 1 through FIG. 5, a compartment unit 100 in the present embodiment includes a main compartment 1 for receiving a turbine engine 200 and an intake compartment 2 disposed on a side of the main compartment 1 and in communication with the main compartment 1. In the example embodiment shown in the figures, the intake compartment 2 is disposed on the main compartment 1 to deliver air to the main compartment 1. However, in other embodiments not illustrated, the intake compartment may be disposed at other side surfaces of the main compartment.

The intake compartment 2 comprises an intake compartment body 21 provided with an intake port and an exhaust port (or supply port with respect to the turbine engine). The intake compartment further comprises an air filter device 22 and a first muffler device 23 disposed at the intake port of the intake compartment.

The intake compartment body 21 may be provided with intake ports of the intake compartment on two opposed side surfaces which for example may be two surfaces parallel to a transmission shaft of the turbine engine 200. In other embodiments not illustrated, the intake compartment body 21 may also be provided with only one intake port, or a plurality of intake ports on its side walls.

Figure 2:
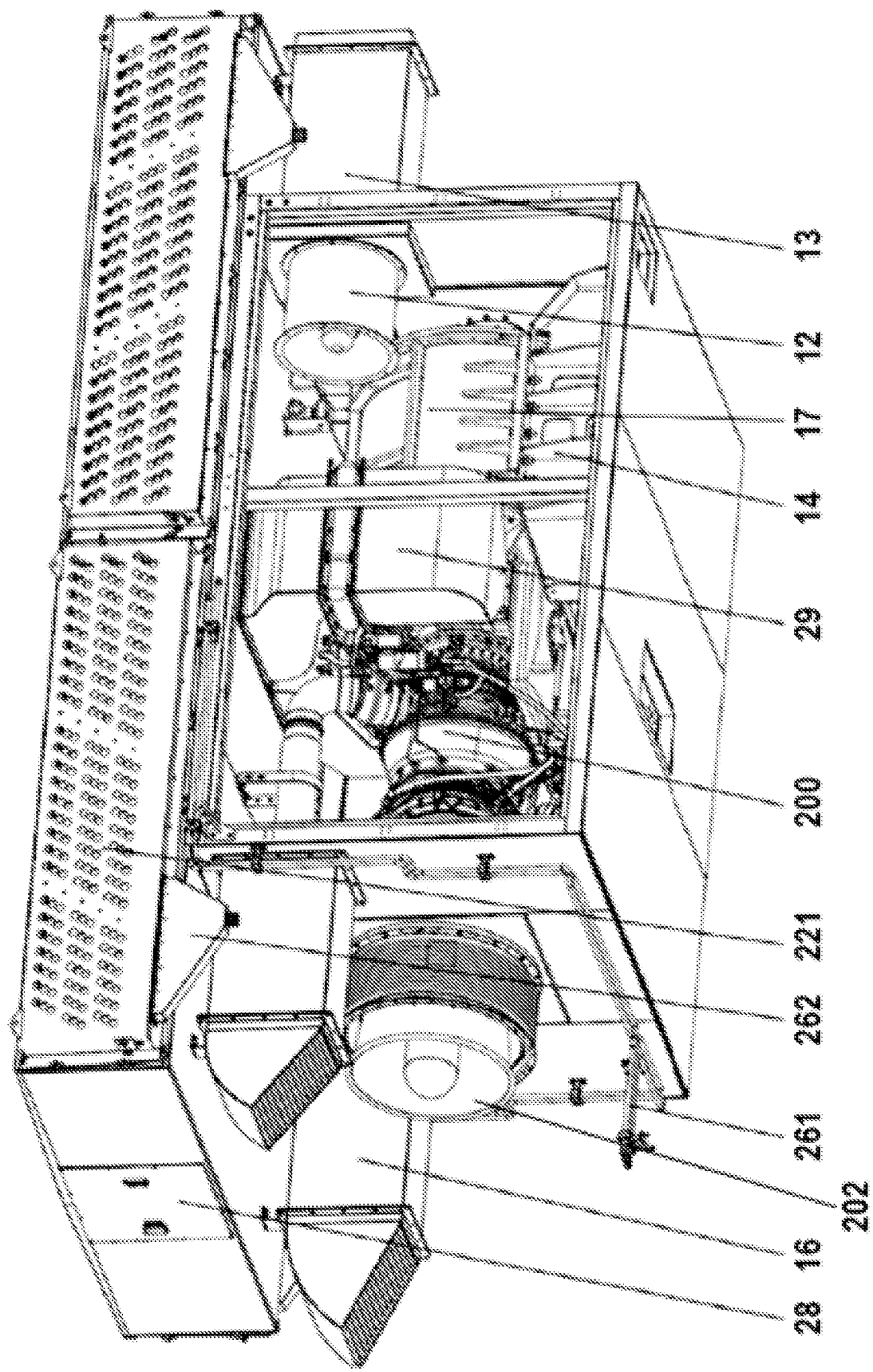
FIG. 2 shows a schematic view in which partial wall of a main compartment is detached from the compartment unit of FIG. 1 to expose the inner structures in the main compartment, with a turbine engine being mounted in the main compartment.
Figure 3:
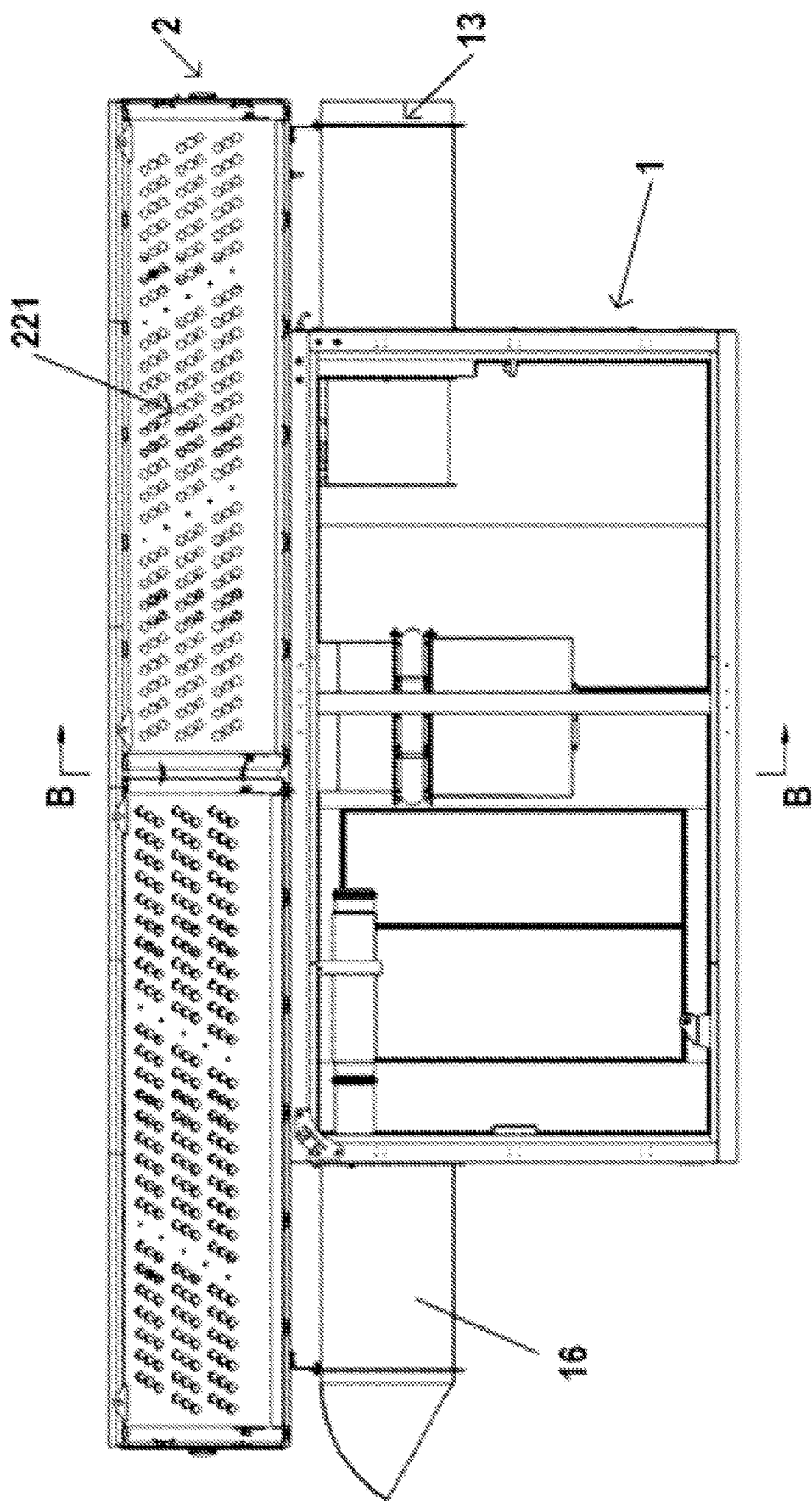
FIG. 3 is a front view of the compartment unit of FIG. 1.
Figure 5:
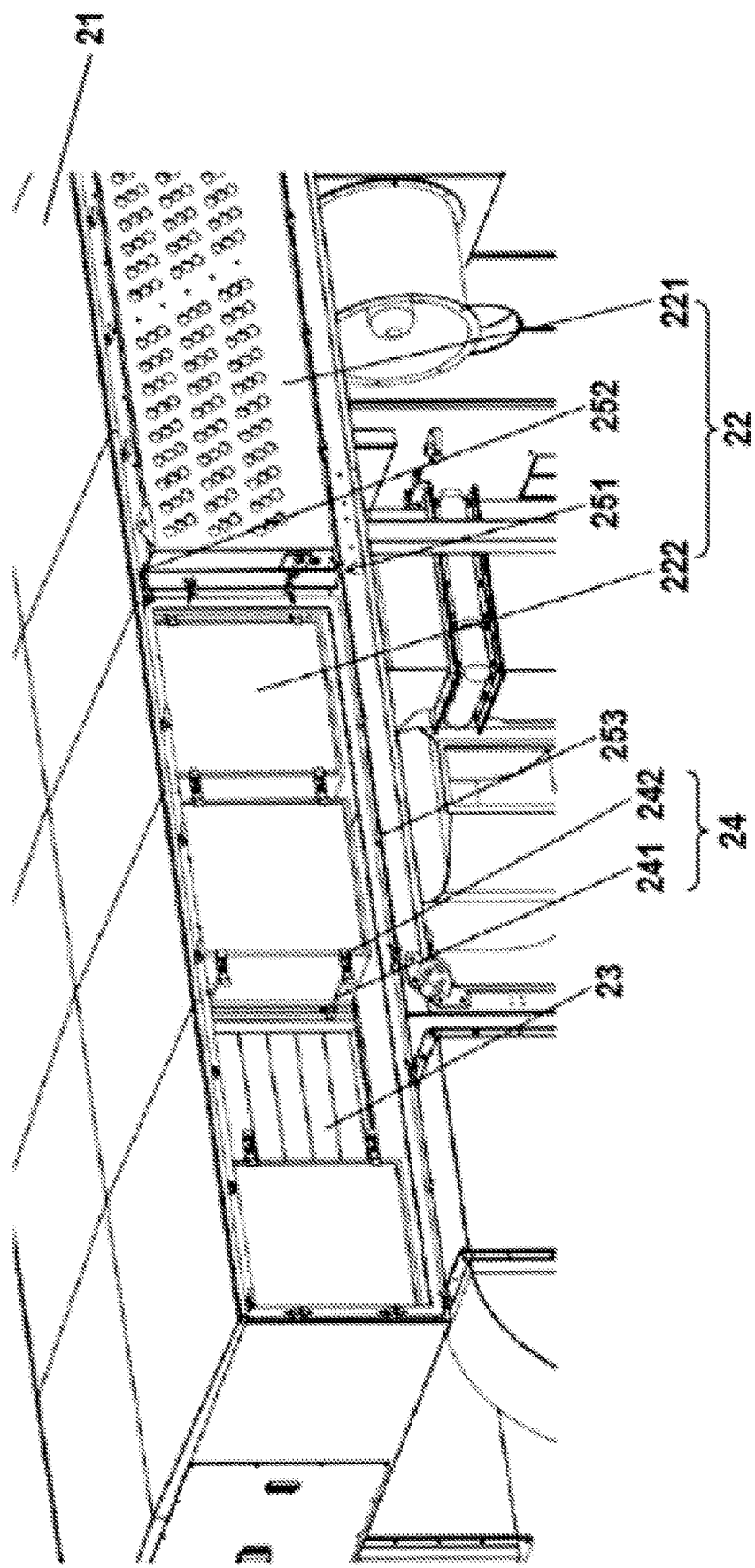
FIG. 5 is an enlarged view of an air intake compartment in FIG. 1 and FIG. 2, wherein partial structures of an inertia separator and partial structures of a filter are detached to show the filter and the muffler.
Figure 6:
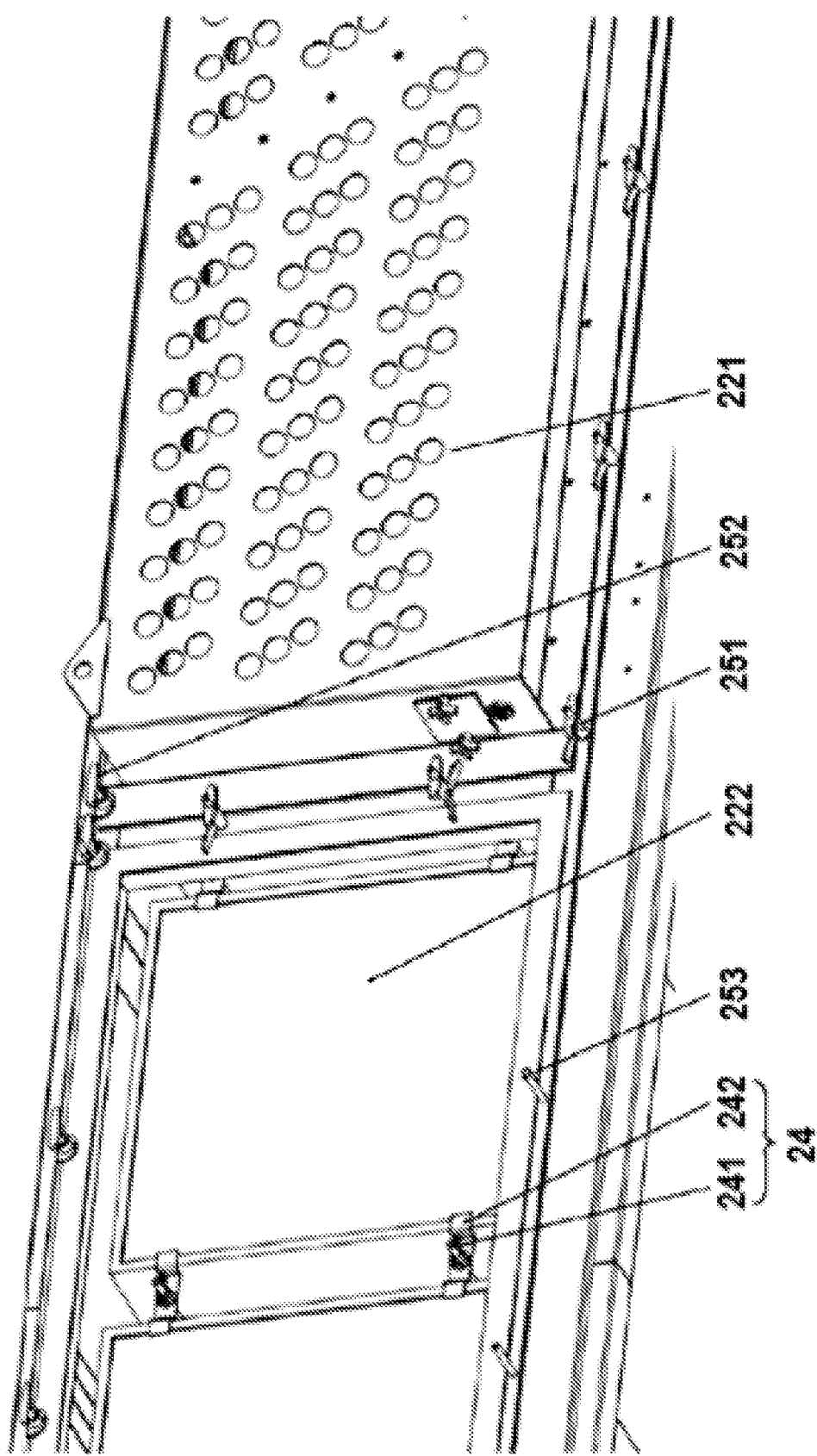
FIG. 6 is an enlarged view of an inertia separator and an air filter in FIG. 3.

FIG. 5 and FIG. 6 show detailed views of the air filter device 22 and the first muffler device 23 at the intake port of the intake compartment. In the present embodiment, the intake compartment 2 comprises two sets of air filter devices 22 and first muffler devices 23 disposed respectively outside two intake ports of the intake compartment. The air filter device 22 is disposed outside the intake port of the intake compartment, and the first muffler device 23 is disposed between the intake port of the intake compartment and the air filter device 22. Each set of air filter device 22 further comprises one inertia separator 221 or a plurality of inertia separators 221 (two inertia separators in the present embodiment) arranged in parallel. The inertia separators 221 are disposed on the outsides of the air filters 222. In FIG. 5 and FIG. 6, a portion of inertia separators 221 and filters 222 are detached to clearly show the positional relationship between the first muffler device 23, the air filters 222 and the inertia separators 221. However, it may be appreciated that in practice, the filters 222 substantially entirely covers the outside of the first muffler device 23, the inertia separators 221 substantially entirely covers the outside of the filters 222, and the external views of the intake compartment 2 are shown in FIG. 1 and FIG. 2 when the filter device and first muffler device 23 are entirely and correctly mounted.

The exhaust port of the intake compartment 2 is in communication with the main compartment 1. Specifically, the compartment unit 100 is configured to have a first air path which is shown by arrows in FIG. 4. The first air path permits air for combustion in the turbine engine 200 to pass from the external through the air filter device 22 and the first muffler device 23 in sequence into the intake compartment body 21, then be delivered through the exhaust port of the intake compartment into the main compartment 1 to enter the intake pipe 29. The intake pipe 29 delivers air to the intake port 201 of the turbine engine 200. The position of the intake port 201 of the turbine engine 200 is substantially also the position of an end of the intake pipe 29. After air is delivered through the intake pipe 29 into the turbine engine 200, air is mixed with fuel in the turbine engine 200.

During the flow of gas along the first air path, the inertia separator 221 can filter away large solid particles in air and liquid (such as water droplets), the air filters 222 can further filter the air that has passed through the inertia separators 221, and the air discharged from the filters 222 enters the intake pipe 29 after being muffled by the first muffler device 23. The exhaust gas after combustion in the turbine engine 200 is discharged outward through the exhaust pipe 202.

It is to be appreciated that in the present embodiment, the intake pipe 29 for delivering air to the turbine engine 200 is part of the compartment unit 100; the exhaust pipe 202 for exhausting gas out of the turbine engine 200 may not be part of the compartment unit 100, and it may be specially mounted on the compartment unit 100 in use to fit with the turbine engine 200.

There may be multiple preferred embodiments for the specific mounting of the air filter device 22 and first muffler device 23 of the intake compartment 2. In the present invention, the inertia separators 221 and filters 222 of the air filter device 22 are both detachably mounted on the intake compartment body 21. For example, referring to FIG. 5, the filters 222 are mounted on the intake compartment body 21 via multiple sets of connectors, wherein each set of connector 24 comprises a screw 241 and a pressing plate 242, the screw 241 extends in a gap between two adjacent filters 222, an inner end of the screw 241 is fixed on the intake compartment body 21, an outer end of the screw 241 is fixed on the pressing plate 242, and the pressing plate 242 is simultaneously fixed on external surfaces of the two adjacent filters 222 to thereby press the filters 222 tightly on the external surface of the first muffler device 23.

In some implementations, referring to FIG. 6, the inertia separator 221 is pressed tightly against the intake compartment body 21 by a mounting screw 253, a wing nut assembly 251 and a compression nut assembly 252. A flange 2211 protrudes on the circumferential edge of the inertia separator 221. When the inertia separator 221 is mounted, the inertia separator 221 may be first placed on the mounting screw 253, and then the flange 2211 of the inertia separator 221 may be fixed via the wing nut assembly 251 and the compression nut assembly 252 to fix the inertia separator 221 on the main compartment body 11.

Figure 7:
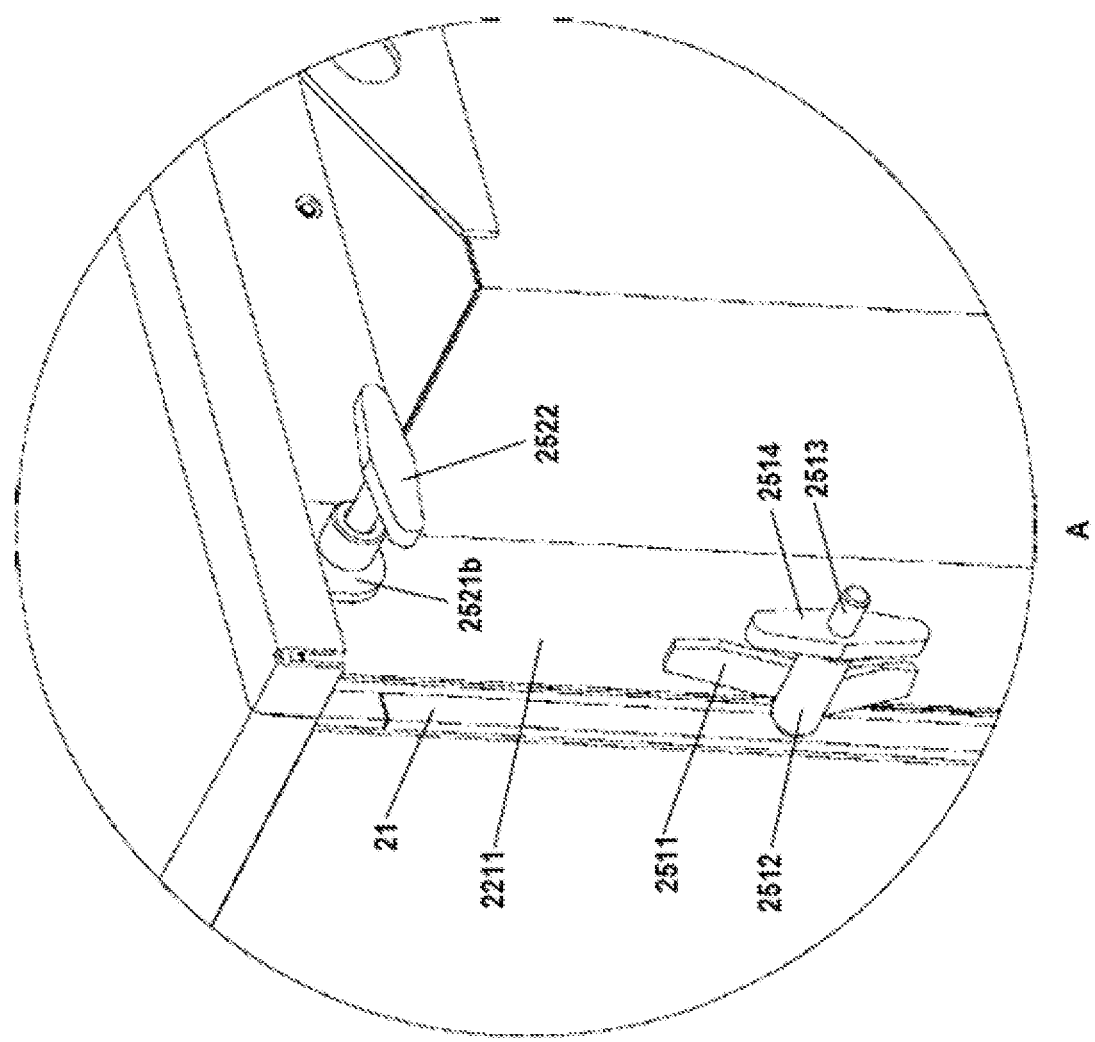
FIG. 7 is a partially enlarged view of portion A of FIG. 1.
Figure 8:
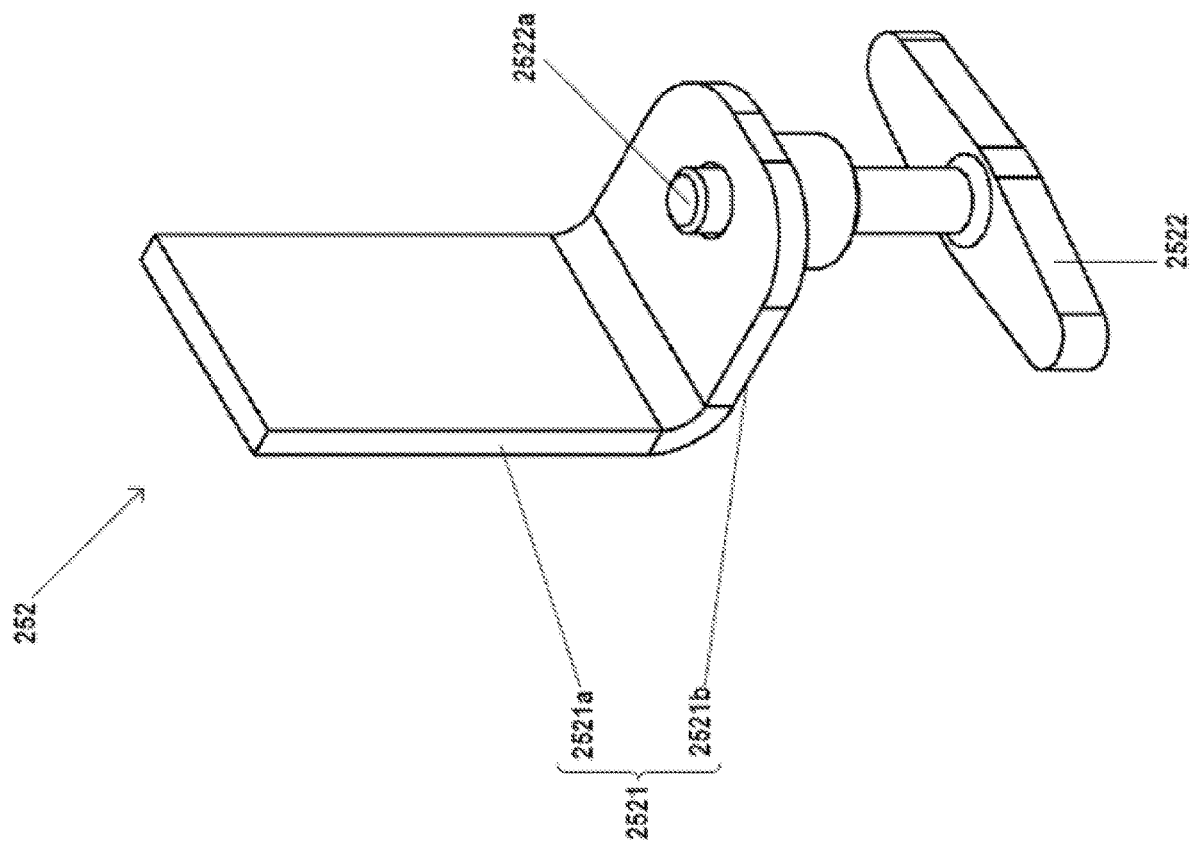
FIG. 8 is an isolated and enlarged view of a pressing plate assembly of FIG. 7.

FIG. 7 and FIG. 8 show specific example structures of the compression nut assembly 252 and the manner of fitting with the flange 2211 of the inertia separator 221. Referring to FIG. 7 and FIG. 8, the compression nut assembly 252 comprises a fixing plate 2521 and a compression screw 2522. The fixing plate 2521 includes a second plate 2521*a* and a first plate 2521*b* integrally forming an L-shaped structure. The first plate 2521*b* is located outside the flange 2211 of the inertia separator 221 and is parallel to the flange 2211. The second plate 2521*a* is perpendicular to the flange of the inertia separator 221 and extends inward from the first plate 2521*b* (it is at a right angle to the first plate 2521*b*) and is fixed to the compartment body 21 by welding. The first plate 2521*b* has a through hole provided with an internal thread. The compression screw 2522 runs through the through hole in the first plate 2521*b* in a threaded engagement manner and can be screwed tightly so that the inner end 2522*a* of the compression screw 2522 presses the flange 2211 of the inertia separator 221. In order to facilitate the operation, the outer end of the compression screw 2522 is provided with a nut-like structure that is convenient for the user to perform the screwing operation.

Figure 9:
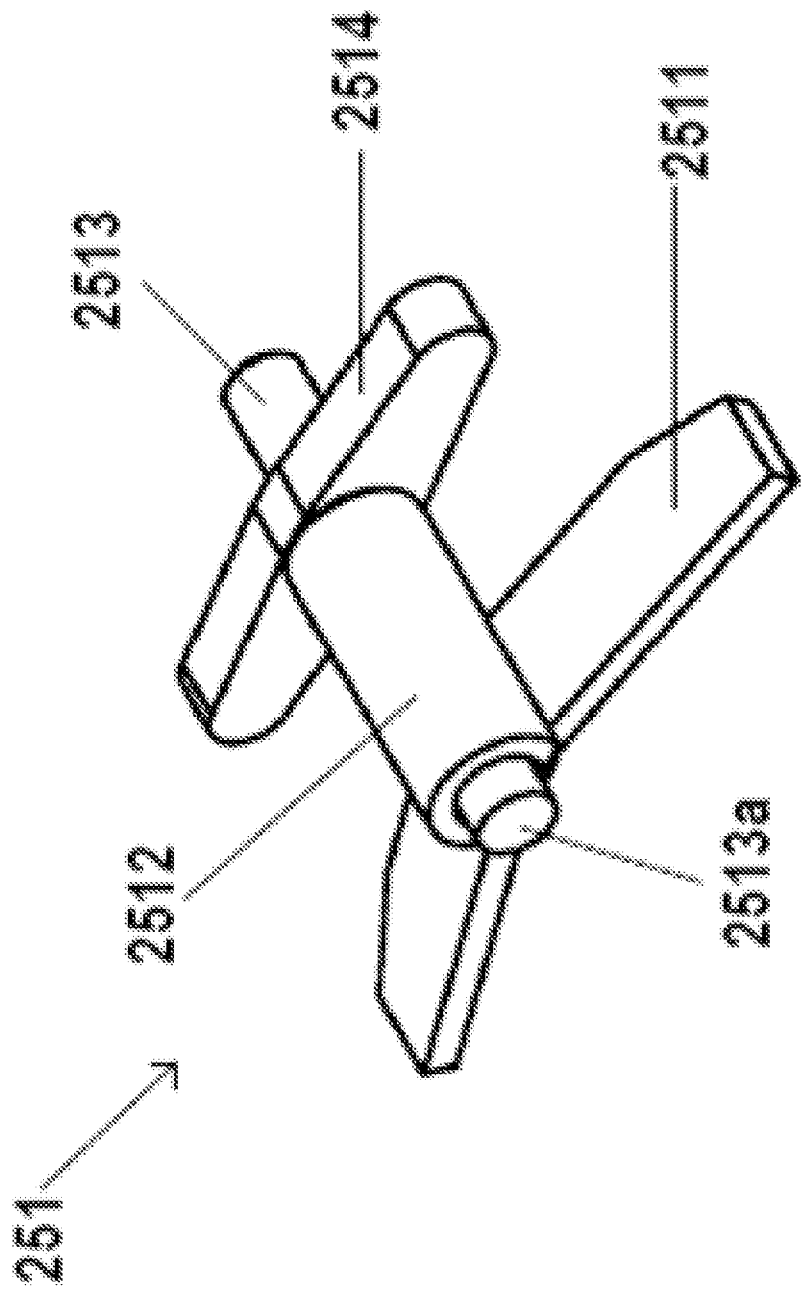
FIG. 9 is an isolated and enlarged view of a wing nut assembly of FIG. 7.
Figure 10:
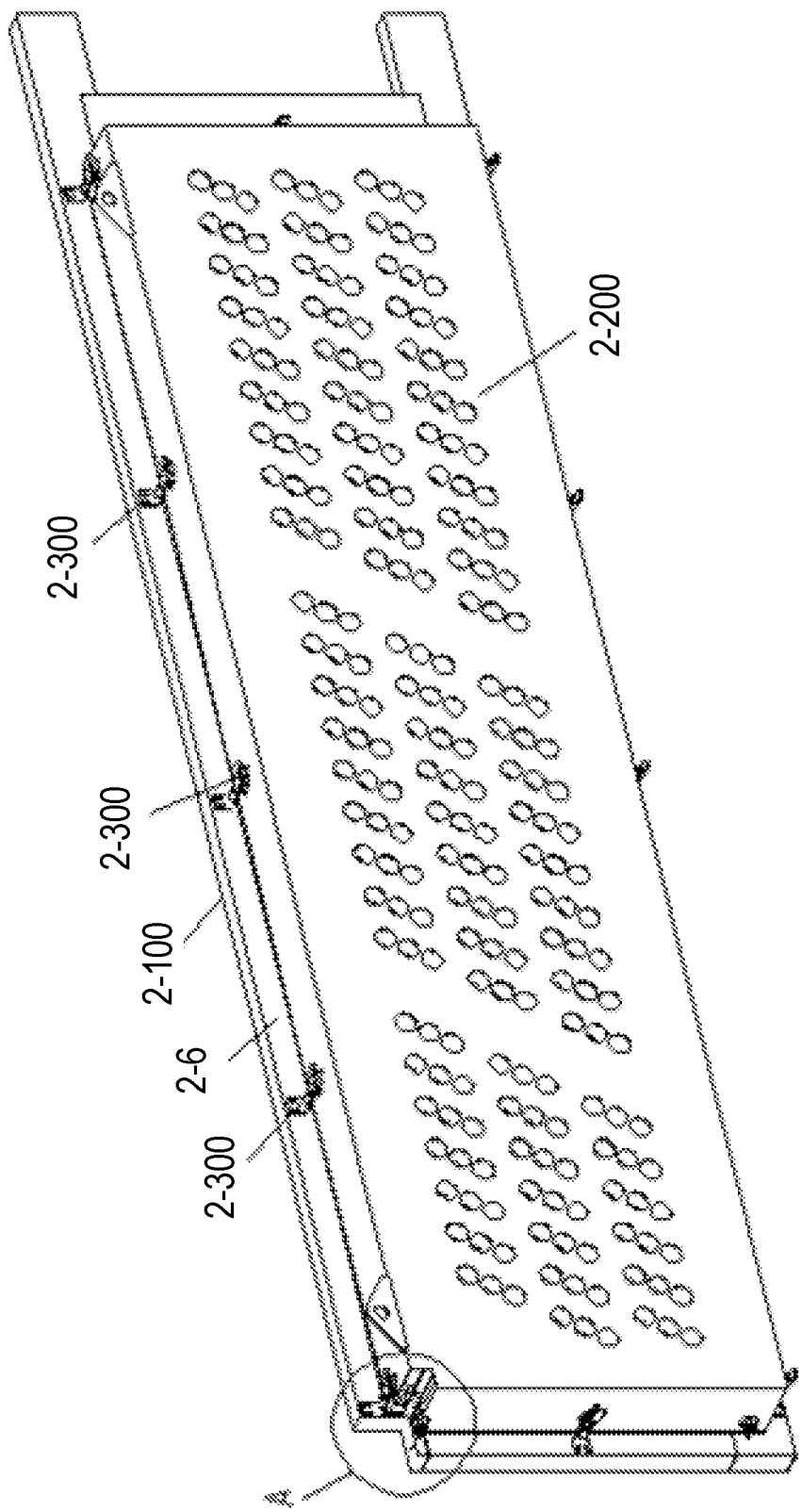
FIG. 10 illustrates a schematic diagram according to a first perspective of a connecting structure of the present disclosure.
Figure 11:
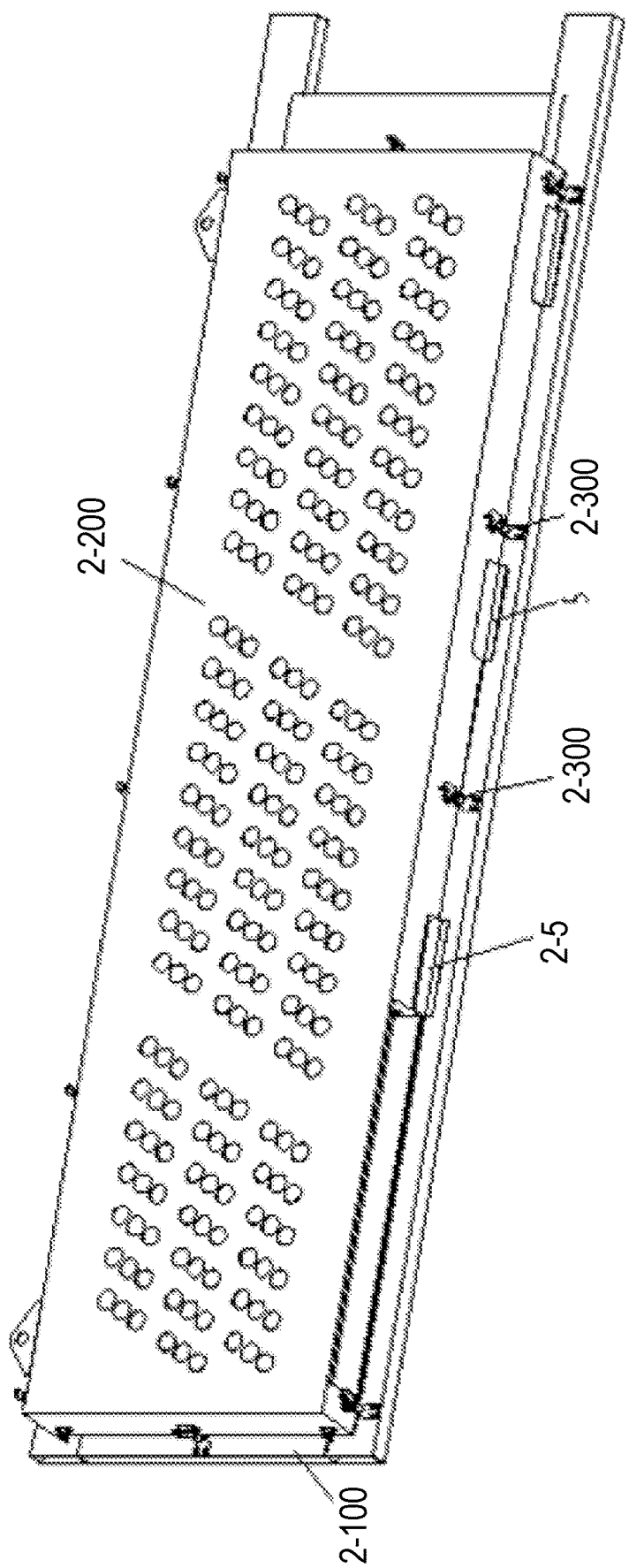
FIG. 11 illustrates a schematic diagram according to a second perspective of a connecting structure of the present disclosure.

FIG. 7 and FIG. 9 show example specific structures of the wing nut assembly 251 and the manner of fitting with the flange 2211 of the inertia separator 221. Referring to FIG. 7 and FIG. 9, it can be seen that the wing nut assembly 251 includes a fixing post 2513, a wing nut 2512 and a nut 2514. An inner end 2513*a* of the fixing post 2513 is welded and fixed to the compartment body 21, a portion of the fixing post 2513 for joining with the nut 2514 is provided with an external thread, and other portions are not provided with threads. The wing nut 2512 is sleeved on the fixing post 2513, and the wing nut 2512 can freely rotate around the fixed rod 2513 without pressure. The wing nut 2512 has wings 2511 capable of pressing the flange 2211 of the inertia separator 221. The nut 2514 is also sleeved on the fixing post 2513 and located outside the wing nut 2512. The nut 2514 is provided with an internal thread and can be engaged with the fixing post 2513 in a manner of threading to be screwed tightly, thereby pressing the wing nut 2512 inwardly so that the wings 2511 of the wing nut 2512 tightly presses the flange 2211 of the inertia separator 221 on the compartment body 21.

In the above-mentioned assembly manner, the detachment of the pressing plate 242, the wing nut assembly 251 and the compression screw assembly 252 may be performed purely manually without special tools, and these components needn't be completely detached, which may prevent the loss of the components. The air filter device 22 and the first muffler device 23 of the intake compartment 2 are detachably mounted on the intake compartment. body 21 to facilitate maintenance and replacement. Further implementations for assembling/disassembling two or more components are disclosed below in relation to FIGS. 10-16. While such assembling/disassembling implementations are illustrated and described in the context associated with the inertia separator assembly and related components of the fracturing system above, the underlying principles and mechanisms used for such assembling and disassembling are applicable to assembling/disassembling any type of work pieces and components.

Figure 12:
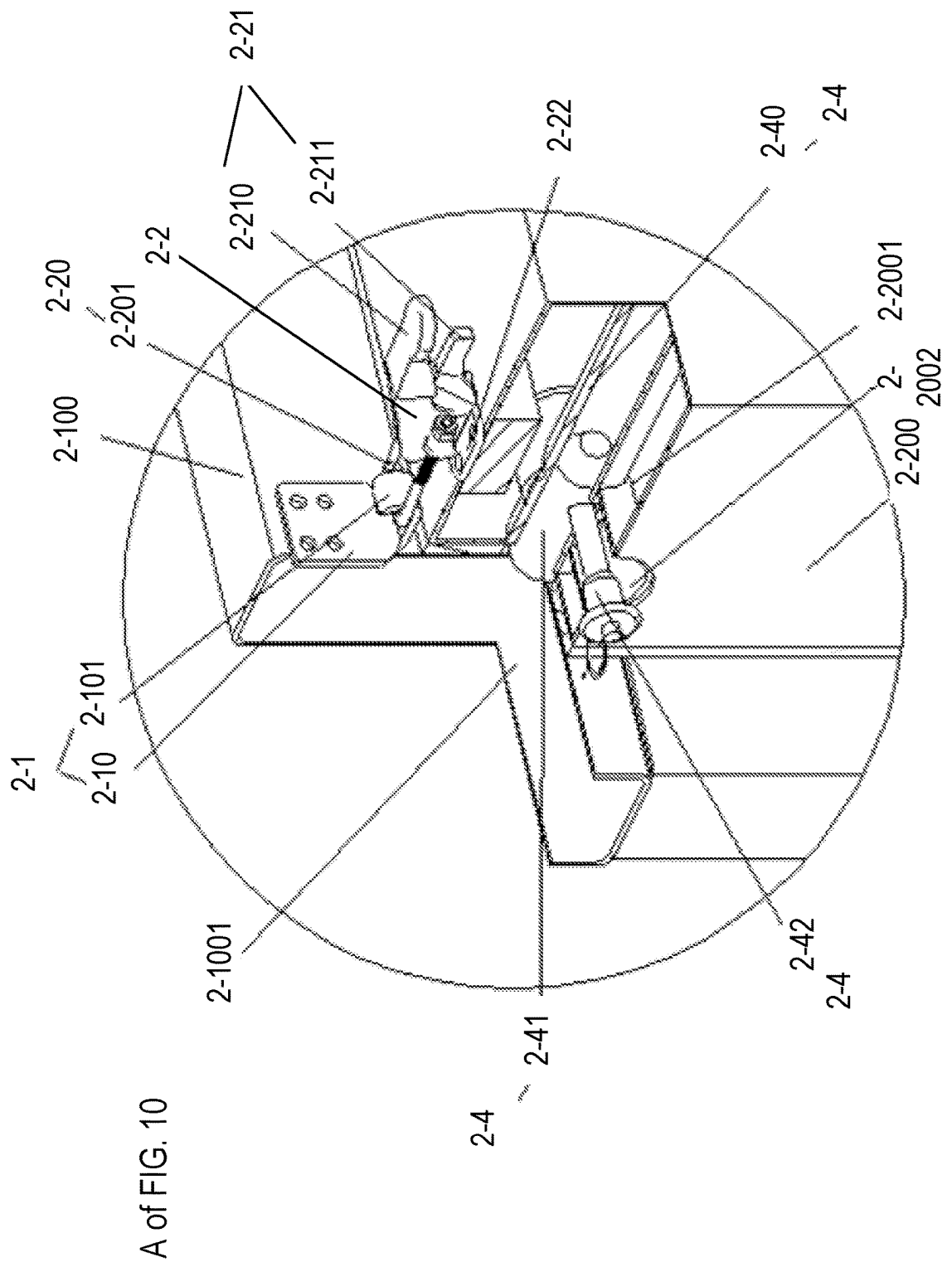
FIG. 12 illustrates an enlarged view of part A according to FIG. 10.
Figure 13:
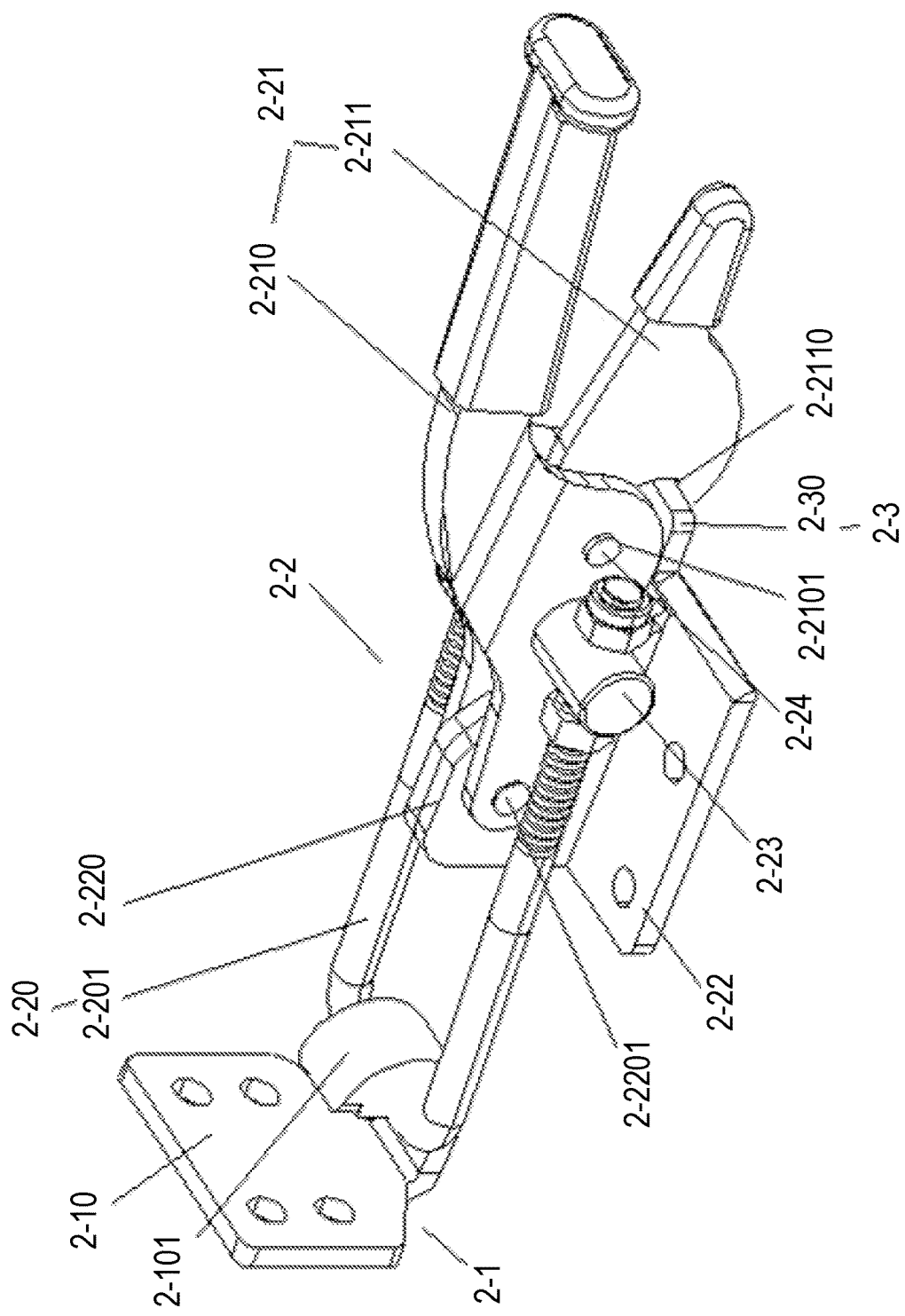
FIG. 13 illustrates a structural schematic diagram according to an embodiment of a connecting structure of the present disclosure.

As shown in FIGS. 10-14. the present disclosure provides an example connecting structure being configured to connect a first workpiece 1-100 and a second workpiece 2-200. The connecting structure as shown in FIGS. 12-13 (portion A of FIG. 10) may include a first connecting assembly 2-1 disposed on the first workpiece 2-100; a second connecting assembly 2-2 disposed on the second workpiece 2-200, wherein the second connecting assembly 2-2 includes a second connecting member 2-20 and a fixing assembly 2-21. The second connecting member 2-20 is movably disposed, so as to connect the second connecting member 2-20 and the first connecting assembly 2-1. The fixing assembly 2-21 is connected with the second connecting member 2-20, and the fixing assembly 2-21 is movably disposed relative to the second connecting member 2-20. The second connecting assembly 2-2 further include a locking portion 2-3, wherein at least part of the locking portion is disposed on the second workpiece 2-200, and the fixing assembly 2-21 is connected with the locking portion 2-3.

The connecting structure provided in the disclosure is configured to connect the first workpiece 2-100 and a second workpiece 2-200 such that the first workpiece 2-100 and the second workpiece 2-200 are conveniently disassembled and assembled. The connecting structure includes: the first connecting assembly 2-1, the second connecting assembly 2-2 and the locking portion 2-3. The first connecting assembly 2-1 is disposed on the first workpiece 2-100. The second connecting assembly 2-2 is disposed on the second workpiece 2-200. The second connecting assembly 2-2 includes the second connecting member 2-20 and the fixing assembly 2-21. The second connecting member 2-20 is movably disposed, so as to connect the second connecting member 2-20 and the first connecting assembly 2-1. The fixing assembly 2-21 is connected with the second connecting member 2-20, and the fixing assembly 2-21 is movably disposed relative to the second connecting member 2-20. At least part of the locking portion 2-3 is disposed on the second workpiece 2-200, and the fixing assembly 2-21 is connected with the locking portion 2-3. In this way, when the second connecting member 2-20 and the first connecting assembly 2-1 are connected, the fixing assembly 2-21 is connected with the locking portion 2-3, so as to lock the second connecting member 2-20 at a connecting position and prevent the first workpiece 2-100 from being separated from the second workpiece 2-200. Moreover, when the first workpiece 2-100 and the second workpiece 2-200 need to be disassembled, only the fixing assembly 2-21 is required to be operated to separate the fixing assembly 2-21 from the locking portion 2-3, and then the fixing assembly 2-21 is operated to drive the second connecting member 2-20 to move, so as to separate the second connecting member 2-20 from the first connecting assembly 2-1, thereby disassembling the first workpiece 2-100 and the second workpiece 2-200. The connecting structure is simple, providing convenient assembling/disassembling operation and improved connection stability when the first workpiece 2-100 and the second workpiece 2-200 are connected.

Merely as examples, the connection mechanism above may be applied to assembling/disassembling various components of the fracturing system. These components may include but are not limited to the inertia separator, inertial separator flanges, the air filters, the frames of the air intake compartment, and the like.

In some example implementations, such connection may be applied between air filters and the turbine engine. For example, to install an air filter assembly (e.g., 22 of FIGS. 1-5 above with or without the inertia separators) on a turbine engine, the first connecting assembly 2-1 above may be disposed on the turbine engine or air intake frame of the turbine engine, and the second connecting assembly 2-2 may be disposed on the air filter, such that the fixing assembly 2-21 is configured to connect the second connecting member 2-20 and the first connecting assembly 2-1 on the turbine engine or the air intake frame of the turbine engine, and the fixing assembly 2-21 is locked on the second connecting assembly 2-2 by means of the locking portion 2-3. Therefore, an operator only needs to operate the fixing assembly 2-21 to disassemble or assemble the turbine engine and the air-filter. A plurality of connecting structures 2-300 may be further implemented, and the plurality of connecting structures 2-300 may be disposed at intervals in an extending direction of the turbine engine or air intake frame of the turbine engine. In some other implementations, a bracket 2-5 is disposed on a bottom surface of the air filter assembly. The bracket 2-5 is connected with the turbine engine or air intake frame of the turbine engine, and may be positioned between two adjacent connecting structures 2-300. A sealing gasket 2-6 is further disposed between the air pre-filter and the turbine engine or air intake frame of the turbine engine. The sealing gasket 2-6 may be annular. By disposing the sealing gasket 2-6, leakage of air flow between the air filter assembly and the turbine engine or air intake frame of the turbine engine is avoided. The air filter assembly may or may not include an inertia separator.

In some example implementations, the second connecting member 2-20 is rotatably disposed around a first predetermined axis. The fixing assembly 2-21 is rotatably disposed around a second predetermined axis relative to the second connecting member 2-20. The first predetermined axis and the second predetermined axis are staggered. In this way, the fixing assembly 2-21 is configured to drive the second connecting member 2-20 to move, and meanwhile rotates relative to the second connecting member 2-20 to be connected with the locking portion 2-3. It should be noted here that a staggered arrangement of the first predetermined axis and the second predetermined axis means that the first predetermined axis and the second predetermined axis are not in the same line, and the first predetermined axis and the second predetermined axis are parallel to each other or define an included angle.

Figure 14:
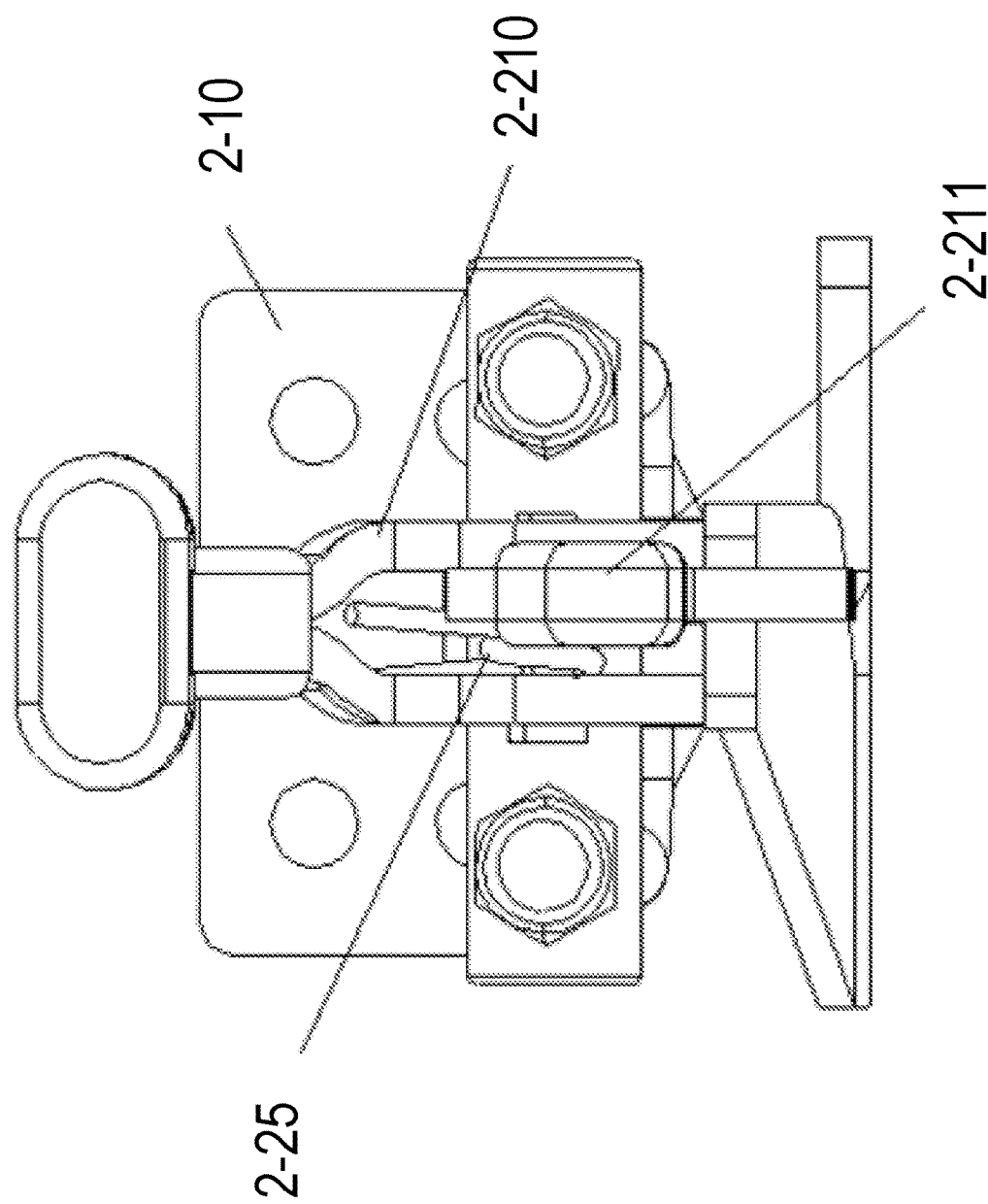
FIG. 14 illustrates a side view according to an embodiment of a connecting structure of the present disclosure.

In an example implementation provided in the disclosure, as shown in FIGS. 12-14, the first connecting assembly 2-1 includes a connecting plate 2-10, and a hook portion 101 is disposed on the connecting plate 2-10. The second connecting member 2-20 includes a hanging ring 2-201. The hanging ring 2-201 is connected with the fixing assembly 2-21. The fixing assembly 2-21 is configured to drive the hanging ring 2-201 to move in a direction close to the first workpiece 2-100. The hanging ring 2-201 is rotatably disposed around the first predetermined axis, and at least part of the hanging ring 2-201 is hung in the hook portion 2-101. In a practical application process, the fixing assembly 2-21 rotates around a first direction to drive the hanging ring 2-201 to move in a direction close to the first connecting assembly 2-1. Then the hanging ring 2-201 is hung in the hook portion 2-101, and the fixing assembly 2-21 rotates in a second direction to enable the hook portion 2-101 to stop the hanging ring 2-201, such that the first workpiece 2-100 and the second workpiece 200 are connected. Further, after the fixing assembly 2-21 rotates in the second direction to a locking position, the fixing assembly 2-21 is locked with the locking portion 2-3. The first direction is opposite the second direction.

In some embodiments, the second connecting assembly 2-2 further includes: (1) a fixed seat 2-22, wherein a protruding plate 2-220 is disposed on the fixed seat 2-22, and the fixing assembly 2-21 is hinged to the protruding plate 2-220; and (2) a rotatable shaft 2-23, wherein the rotatable shaft 2-23 is connected with the hanging ring 2-201, and the rotatable shaft is connected with the fixing assembly 2-21, the fixing assembly 2-21 drives the hanging ring 2-201 to move by means of the rotatable shaft 2-23, and the hanging ring 2-201 rotates around an axis of the rotatable shaft 2-23. A first hinge point 2-2201 is provided on the protruding plate 2-220, and the first hinge point 2-2201 is close to the connecting plate 2-10 relative to the axis of the rotatable shaft 2-23. In this way, when the fixing assembly 2-21 rotates around the first hinge point 2-2201, the rotatable shaft 2-23 is configured to drive the hanging ring 2-201 to move in a direction close to or away from the first connecting assembly 2-1.

During an example implementation, as shown in FIG. 13, the locking portion 2-3 includes a clamping plate 2-30. The clamping plate 2-30 is disposed on the fixed seat 2-22, and the clamping plate 2-30 extends from the fixed seat 2-22 in a direction away from the first workpiece 2-100. The fixing assembly 2-21 includes: a rotatable handle 2-210 hinged to the protruding plate 2-220 and connected with the hanging ring 2-201, wherein the rotatable handle 2-210 is configured to drive the hanging ring 2-201 to move; and a locking handle 2-211, wherein the locking handle 2-211 is hinged to the rotatable handle 2-210, a clamping groove 2-2110 is provided on the locking handle 2-211, and the locking handle 2-211 is connected with the clamping plate 2-30 in a clamped manner by means of the clamping groove 2-2110. The locking handle 2-211 is provided with a guide end surface connected with an inner wall of the clamping groove 2-2110, the guide end surface is a curved surface, the guide end surface is in contact with the clamping plate 2-30, and when the locking handle 2-211 rotates, the clamping plate 2-30 is connected in the clamping groove 2-2110 in a clamped manner along the guide end surface.

In order to make the clamping groove 2-2110 and the clamping plate 2-30 directly and stably connected, as shown in FIGS. 13-14, the second connecting assembly 2-2 further includes: a hinge shaft 2-24, wherein the hinge shaft 2-24 sequentially penetrates the rotatable handle 2-210 and the locking handle 2-211, and the locking handle 2-211 rotates around the hinge shaft 2-24; and a torsion spring 2-25 sleeving the hinge shaft 2-24 and positioned between the rotatable handle 2-210 and the locking handle 2-211, wherein two ends of the torsion spring 2-25 are connected with the rotatable handle 2-210 and the locking handle 2-211 respectively. In this way, the locking handle 2-211 rotates around the second hinge point 2-2101, and the locking handle 2-211 is kept locked by means of an elastic force of the torsion spring 2-25. When disassembly is required, unlocking is realized by only manually lifting the rotatable handle 2-210 or the locking handle 2-211.

In another example implementation process, as shown in FIG. 12, a first step structure 2-1001 is disposed on the first workpiece 2-100, and a second step structure 2-2001 is disposed on the second workpiece 2-200. A first step end surface of the first step structure 2-1001 and a second step end surface of the second step structure 2-2001 may be positioned on a same plane. The connecting structure further includes: a loading assembly 2-4 disposed on the second step end surface, wherein the loading assembly 2-4 is movably disposed in a direction close to or away from the first workpiece 2-100, and at least part of the loading assembly 2-4 is in lap joint with the second step end surface. In this way, the loading assembly 2-4 is configured to carry a gravity load of the second workpiece 2-200, so as to reduce gravity borne by the second connecting member 2-20.

In some example implementations, the loading assembly 2-4 includes: a sleeve 2-40 disposed on the second step end surface, wherein an opening is provided on a wall of the sleeve 2-40; a loading pin 2-41 penetrating the sleeve 2-40 and moving relative to the sleeve 2-40, wherein at least part of the loading pin 2-41 is in lap joint with the second step end surface; and a limiting rod 2-42, wherein at least part of the limiting rod 2-42 penetrates the opening to be connected with the loading pin 2-41, and the limiting rod 2-42 is configured to drive the loading pin 2-41 to move. In this way, an operator can conveniently operate the loading pin 2-41 by means of the limiting rod 2-42, wherein an avoidance groove 2-2002 is further provided on a second adjusting end surface, and wherein at least part of the limiting rod 2-42 is positioned in the avoidance groove 2-2002, such that the loading pin 2-41 is positioned at an initial position. The avoidance groove 2-2002 is configured to limit the limiting rod 2-42, so as to prevent the limiting rod 2-42 from driving the loading pin 2-41 to move. After the first workpiece 2-100 and the second workpiece 2-200 are connected, the limiting rod 2-42 is lifted from the avoidance groove 2-2002, and the limiting rod 2-42 is configured to drive the loading pin 2-41 to slide in a direction of the first step end surface, such that the loading pin 2-41 is configured to share gravity of the second workpiece.

Figure 15:
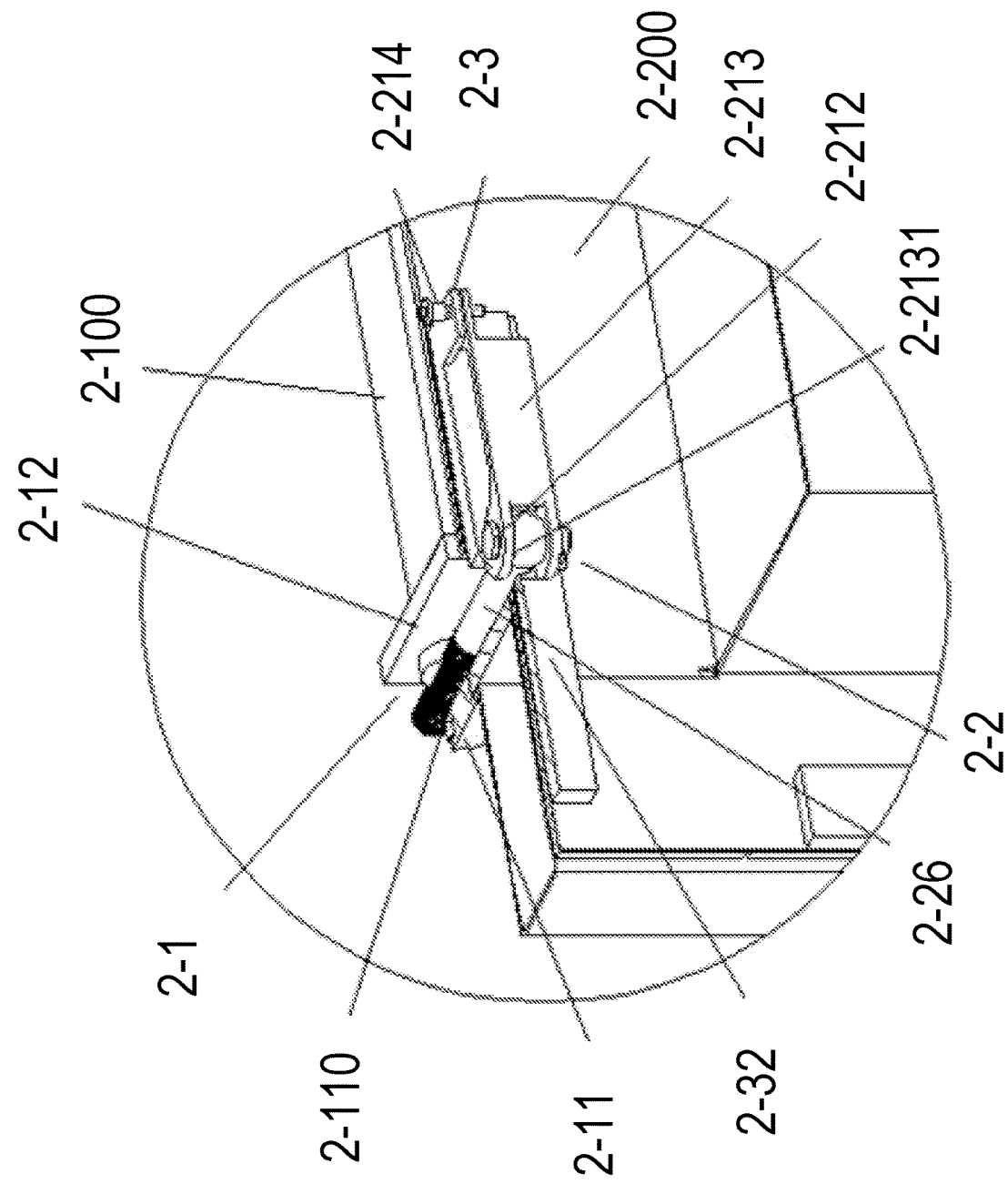
FIG. 15 illustrates a structural schematic diagram according to another embodiment of a connecting structure of the present disclosure.
Figure 16:
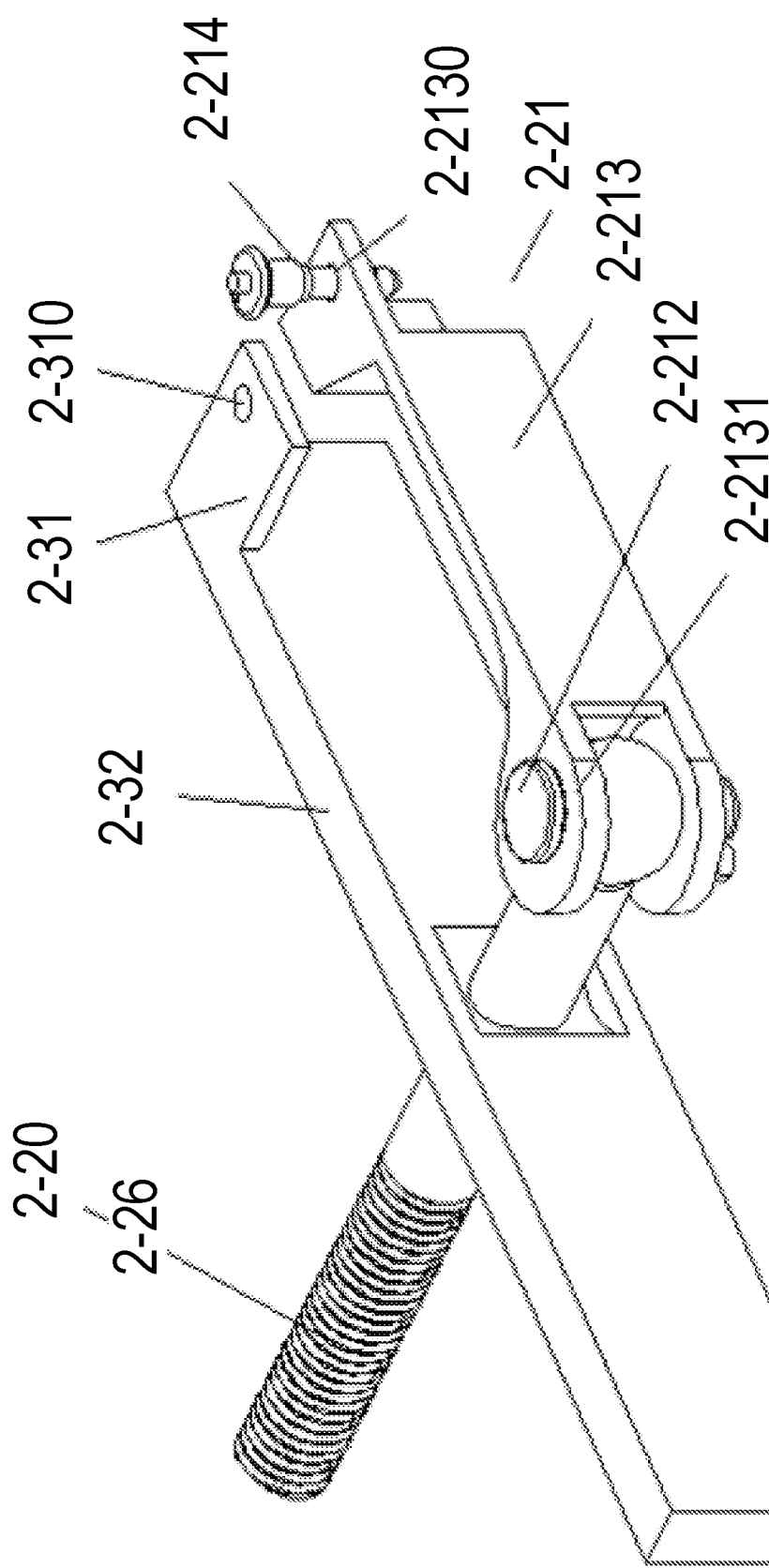
FIG. 16 illustrates a structural schematic diagram of a connecting assembly according to an embodiment of a connecting structure of the present disclosure.

As shown in FIGS. 15 and 16, in other example implementations provided in the disclosure, the first connecting assembly 2-1 includes a supporting shaft 2-11. The supporting shaft 2-11 is rotatably disposed on the first workpiece 2-100 around an axis of the supporting shaft, a penetration hole 2-110 is provided on the supporting shaft 2-11, and an internal thread is disposed in the penetration hole 2-110. The second connecting member 2-20 includes a pressing pull rod 2-26. An external thread is disposed on the pressing pull rod 2-26. The fixing assembly 2-21 is configured to drive the pressing pull rod 2-26 to rotate around the first predetermined axis, and the pressing pull rod 2-26 is in threaded connection to the penetration hole 2-110. The pressing pull rod 2-26 is in threaded connection with the penetration hole 2-110, such that the first workpiece 2-100 and the second workpiece 2-200 are connected. After the fixing assembly 2-21 drives the pressing pull rod 2-26 to rotate around the first predetermined axis, the fixing assembly 2-21 rotates around the second predetermined axis to be connected with the locking portion 3.

The fixing assembly 2-21 may include: a rotatable pin 2-212, wherein a first through hole is provided at one end, away from the supporting shaft 2-11, of the pressing pull rod 2-26, the first through hole extends in a radial direction of the pressing pull rod 2-26, and at least part of the rotatable pin 2-212 penetrates the first through hole; and a rotatable pressing plate 2-213, wherein a second through hole opposite the first through hole is provided on the rotatable pressing plate 2-213, wherein the rotatable pin 2-212 sequentially penetrates the second through hole and the first through hole, and wherein the rotatable pressing plate 2-213 rotates around the rotatable pin 2-212. In this way, by configuring a stopping action of the rotatable pin 2-212 and a wall of the second through hole on the rotatable pressing plate 2-213, the rotatable pressing plate 2-213 drives the pressing pull rod 2-26 to rotate around the first predetermined axis, and meanwhile, the rotatable pressing plate 213 rotates around the rotatable pin 2-212.

In some example implementations, the locking portion 2-3 includes a lug plate 2-31, wherein the lug plate 2-31 is disposed on the second workpiece 2-200, and a first locking hole 2-310 is provided on the lug plate 2-31. A second locking hole 2-2130 is provided on the rotatable pressing plate 2-213, and a push-pull pin 2-214 is sequentially inserted into the first locking hole 2-310 and the second locking hole 2-2130, so as to fix the rotatable pressing plate 2-213 at a locking position. The rotatable pressing plate 2-213 is locked and unlocked by pushing and pulling the push-pull pin 2-214 into the first locking hole 2-310 and the second locking hole 2-2130, providing a convenient assembling/disassembling operation with strong structural stability.

Further, the locking portion 2-3 may include a mounting plate 2-32, wherein the mounting plate 2-32 is disposed on the second workpiece 2-200. The lug plate 2-31 is disposed on the mounting plate 2-32. A third through hole is provided on the mounting plate 2-32, and the pressing pull rod 2-26 penetrates the third through hole and then penetrates the penetration hole 2-110. The first connecting assembly 2-1 may further include: a supporting plate 2-12, wherein the supporting plate 2-12 is disposed on the first workpiece 2-100, and the supporting shaft 2-11 is disposed on the supporting plate 2-12. The supporting shaft 2-11 is rotatably disposed around an axis thereof relative to the supporting plate 2-12 such that the pressing pull rod 2-26 conveniently penetrates the penetration hole 2-110.

In some example implementations, an eccentric cam 2-2131 is disposed at an end of the rotatable pressing plate 2-213, and the second through hole is provided on the eccentric cam 2-2131. By means of an eccentric action of the eccentric cam 2-2131, when the rotatable pressing plate 2-213 rotates close to the locking portion 2-3, the mounting plate 2-32 is further pressed, thereby pressing the mounting plate 2-32, the air pre-filter, the sealing gasket 2-6 and the turbine engine.

In view of the description, it can be seen that the embodiments of the disclosure achieve the following technical effects:

The example connecting structure provided above in relation to FIGS. 10-16 is configured to connect the first workpiece 2-100 and the second workpiece 2-200 such that the first workpiece 2-100 and the second workpiece 2-200 are conveniently disassembled and assembled. The connecting structure includes: the first connecting assembly 2-1, the second connecting assembly 2-2 and the locking portion 2-3. The first connecting assembly 2-1 is disposed on the first workpiece 2-100. The second connecting assembly 2-2 is disposed on the second workpiece 2-200, the second connecting assembly 2-2 includes the second connecting member 2-20 and the fixing assembly 2-21. The second connecting member 2-20 is movably disposed, so as to connect the second connecting member 2-20 and the first connecting assembly 2-1. The fixing assembly 2-21 is connected with the second connecting member 2-20, and the fixing assembly 2-21 is movably disposed relative to the second connecting member 2-20. At least part of the locking portion 2-3 is disposed on the second workpiece 2-200, and the fixing assembly 2-21 is connected with the locking portion 2-3. In this way, when the second connecting member 2-20 and the first connecting assembly 2-1 are connected. Further, the fixing assembly 2-21 is connected with the locking portion 2-3, so as to lock the second connecting member 2-20 at a connecting position and prevent the first workpiece 2-100 from being separated from the second workpiece 2-200. Moreover, when the first workpiece 2-100 and the second workpiece 2-200 are required to be disassembled, only the fixing assembly 2-21 is required to be operated to separate the fixing assembly 2-21 from the locking portion 2-3, and then the fixing assembly 2-21 is operated to drive the second connecting member 2-20 to move, so as to separate the second connecting member 2-20 from the first connecting assembly 2-1, thereby disassembling the first workpiece 2-100 and the second workpiece 2-200. The connecting structure is simple, providing a convenient assembling/ disassembling operation with improved connection stability when the first workpiece 2-100 and the second workpiece 2-200 are connected is improved. The first workpiece 2-100, for example, may be the turbine engine, the frame at intake ports of the air intake compartment for the turbine engine, and the like. The second work piece 2-100 may be the air filter assembly above. The air filter assembly may include the air filters and the inertia separators and other components associated with the air filters and the inertia separators (such as the various frames and flanges).

Turning back to FIG. 2, the intake compartment 2 for the turbine engine further includes a purge line 261 and a collection container 262 used in conjunction with the inertia separator 221. The purge lines may be connected to a source of compressed air (or other gaseous substance). The purge line may be routed to the top of the inertia separator. A purging end of the purge line 261 is aligned with an air channel in the inertia separator 221, and the collection container 262 is disposed at a bottom of the inertia separator 221 and can communicate with the air channel in the inertia separator 221. The purge line 261 can blow the impurities in the inertia separator 221 into the collection container 262. The purging end may be installed on the top of the inertia separate, and blow pressurized air or other gaseous substance towards the bottom of the inertia separator in a direction perpendicular to the intake air flow direction shown by the arrows in FIG. 4.

In the present embodiment, the intake compartment 2 may further be provided with a combustible gas detector which may be mounted at a mounting port 27 of the combustible gas detector as shown in FIG. 1. The combustible gas detector can monitor the content of combustible gas in the intake air in real time and trigger an alarm to ensure the safety of the turbine engine 200.

Further referring to FIG. 1, the intake compartment body 21 is further provided with a manhole for maintenance personnel to enter, and an openable manhole cover 200 may be mounted on the manhole. The setting of the manhole can facilitate the maintenance personnel to enter the intake compartment for inspection and maintenance.

Figure 18:
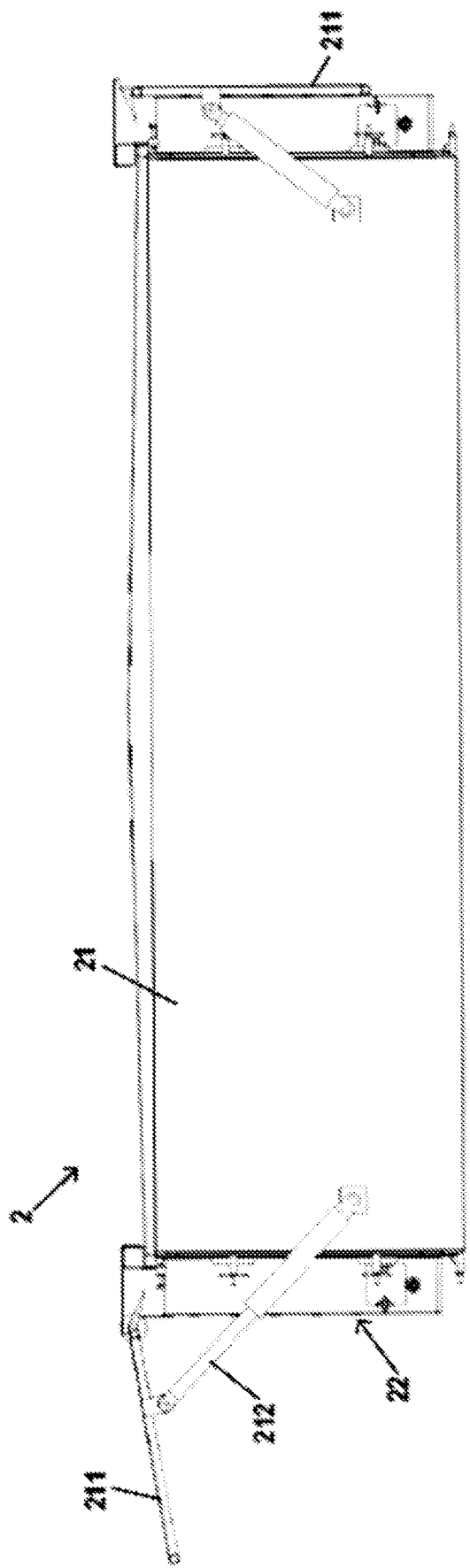
FIG. 18 is a side view of an example air intake compartment including a rain shield.

In some implementations, referring to FIG. 18, the intake compartment 2 further comprises an openable shield plate 211 which arranged at the intake port of the intake compartment and outside the air filter device 22. The shield plate 211 can be opened and closed when driven by the drive cylinder 212 for shield plate. The shield plate 211 is able to prevent rainwater and impurities from entering the intake compartment 2 while not in use.

Figure 4:
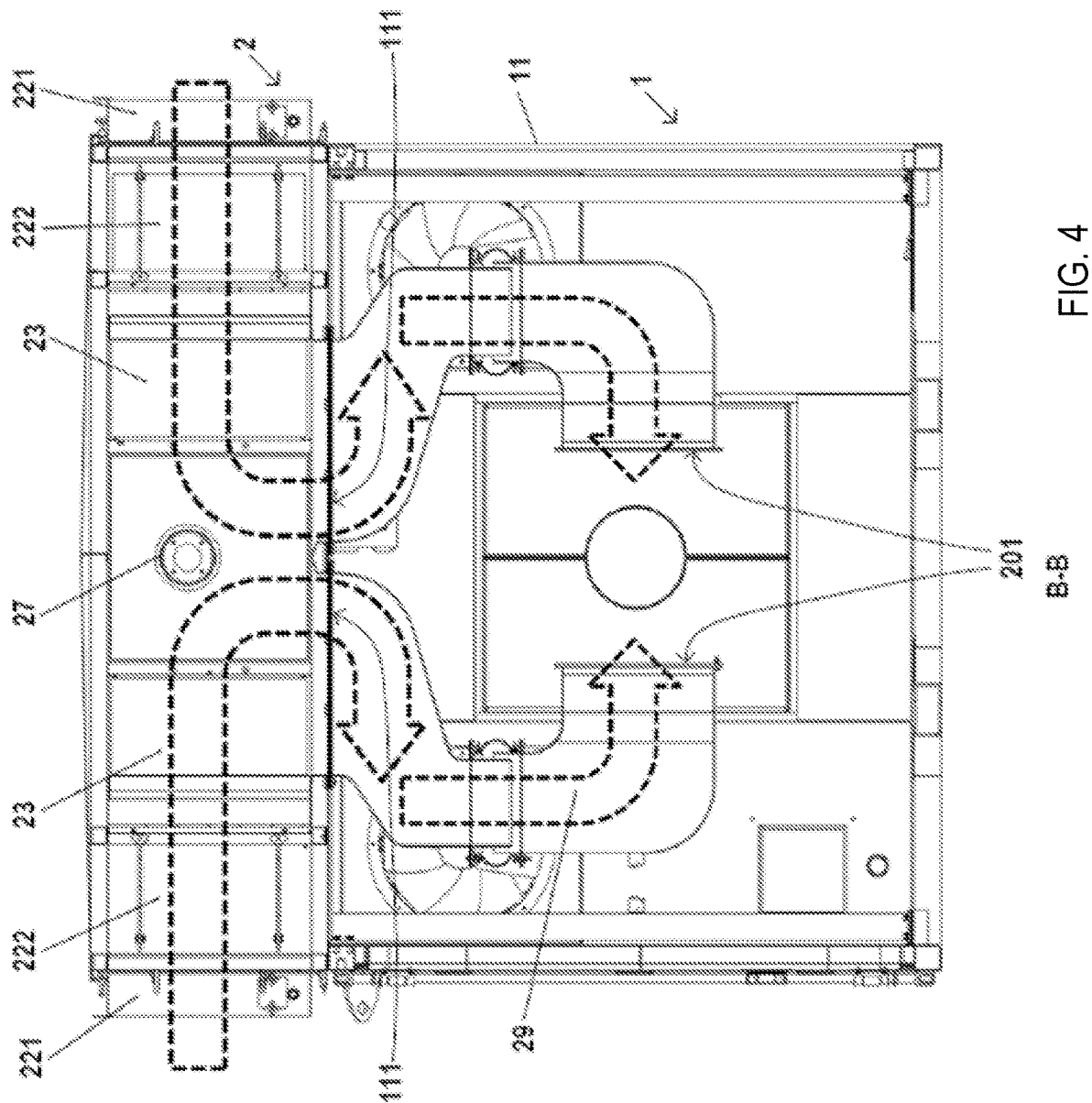
FIG. 4 is a cross-sectional view taken along line B-B of FIG. 3, wherein arrows show a first air path.

The main compartment 1 of the compartment unit 100 of the present embodiment may also have various other components. Referring to FIG. 1 and FIG. 2, the main compartment 1 includes a main compartment body 11, a circulation air guide device 12 and second muffler device(s). The main compartment body 11 is provided with an intake port, an exhaust port, and a communication port 111 connected with the exhaust port of the intake compartment. The communication port 111 of the main compartment 1 is shown in FIG. 4, and the position of the communication port 111 shown in the figure aligns with the intake port of the intake pipe 29. The air from the external for the combustion in the turbine engine is delivered from the intake compartment 2 into the intake pipe 29 through the communication port 111 of the main compartment 1.

The circulation air guide device 12 may be implemented as, for example, a fan, and the circulation air guide device 12 is disposed at the intake port of the main compartment body 11. The second muffler device for example includes an intake muffler 13 mounted at the intake port of the main compartment and an exhaust muffler 16 mounted at the exhaust port of the main compartment.

The main compartment 1 provides a second air path for the compartment unit 100. The second air path allows circulation air for cooling the internal space of the main compartment body 11 to be driven by the circulation air guide device 12 from the external through the intake muffler 13 into the main compartment body 11 and discharged out of the main compartment body 11 through the exhaust muffler 16.

As described above, the compartment unit 100 in the present embodiment has two air flow paths, namely, the first air path and the second air path. The air for the combustion in the turbine engine 200 passes through the first air path and enters the turbine engine 200 in the main compartment 1 from the external through the intake compartment 2. The circulation air for cooling the main compartment body 11 pass through the second gas flow and enters the main compartment body 11 from the external and is discharged to the external environment.

In some implementations, a top wall, a bottom wall, and side walls of the main compartment body 11 may all be filled with a sound insulation material to minimize the impact of noise generated by the turbine engine 200 on the external. In some implementations, one or both of the two opposite side walls of the main compartment body 11 that are parallel to the power transmission shaft of the turbine engine 200 may also be provided with a soundproof door for easy access for maintenance personnel. The soundproof door may be formed as a part of the side wall, and the soundproof door may also completely replace the side wall.

Figure 17:
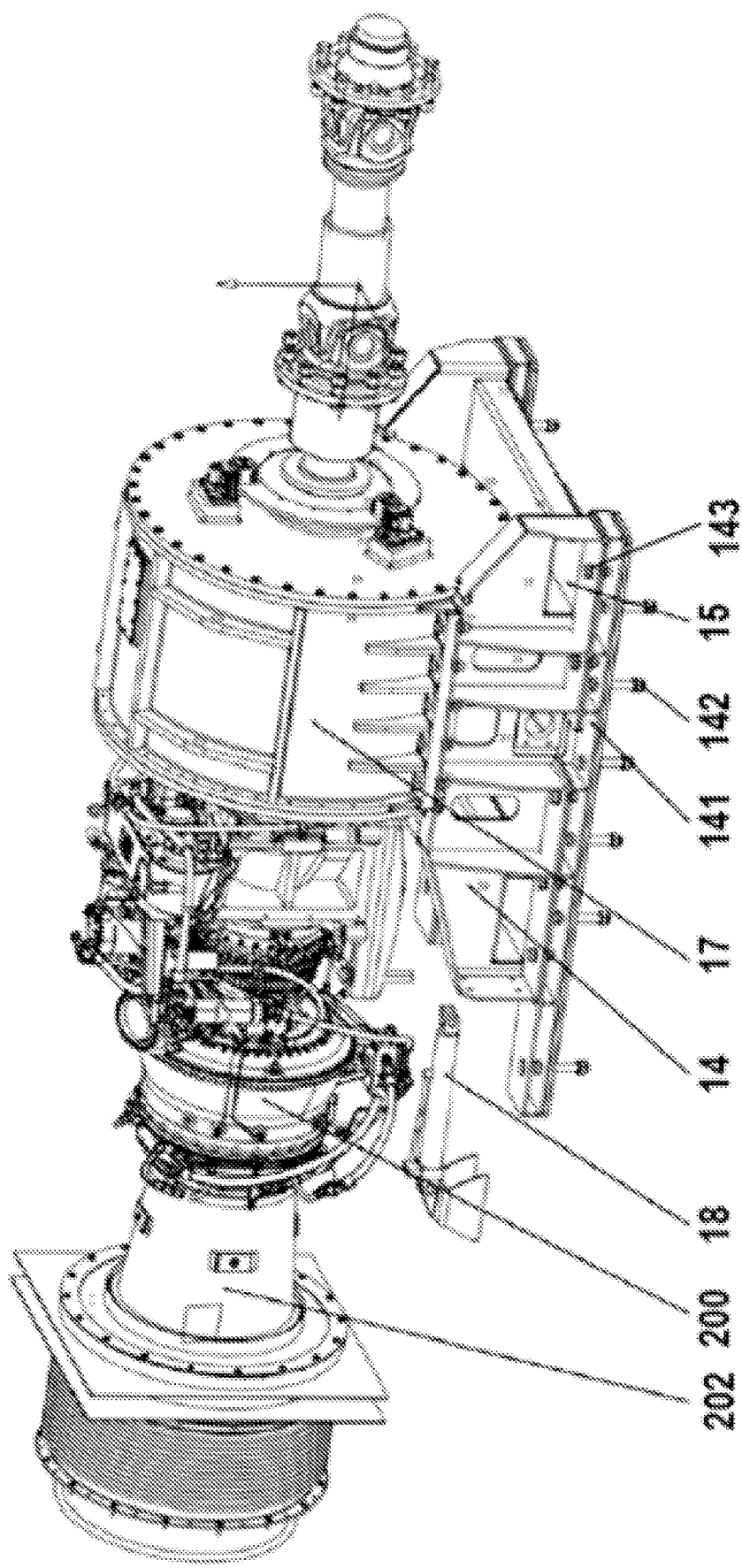
FIG. 17 is schematic view of a power system base of the compartment unit of FIG. 1, and a reduction gearbox and a turbine engine mounted thereon according to an example embodiment.

In some implementations, referring to FIG. 2 and FIG. 17, the main compartment 1 further includes a power system base 14, a slide rail 141 and a driving device 18. The turbine engine 200 can be connected to a reduction gearbox 17 which is mounted on the power system base 14, or the turbine engine 3-200 is directly mounted on the power system base 14. The power system base 14 can slide on the slide rail 141 driven by the driving device 18, to facilitate the movement of the turbine engine 200 into or out of the main compartment body 11. The slide rail 141 is fixed in the main compartment body 11 by bolts 142. The driving device 18 may be implemented as, for example, an oil cylinder or an air cylinder. In some implementations, forklift holes 15 are also provided on the power system base 14 to facilitate removing the power system base 3-14 out of the main compartment body 11.

When the turbine engine 200 operates, the power system base 14 and the slide rail 141 are fixed together with detachable bolts 143 to avoid their relative displacement; when the turbine engine 200 stops working and is to be removed, the detachable bolts 143 may be unscrewed to allow the power system base 14 to slide on the slide rail 141.

In some implementations, a limiting device may be provided on the slide rail 141, and configured to prevent the power system base from sliding further when the power system base slides to a predetermined position.

Figure 19:
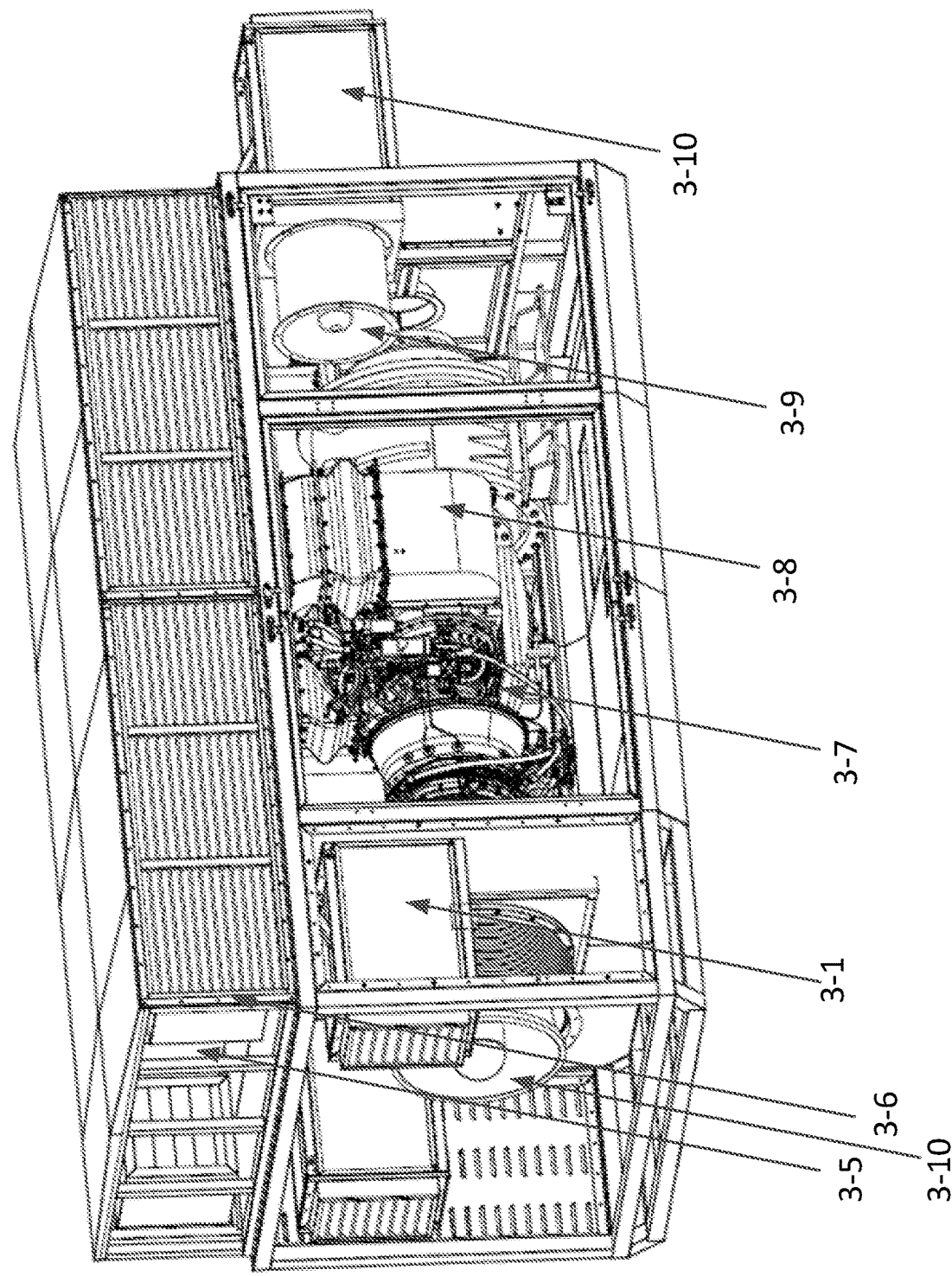
FIG. 19 is a schematic structural diagram of an example soundproof cabin of a turbine engine.
Figure 20:
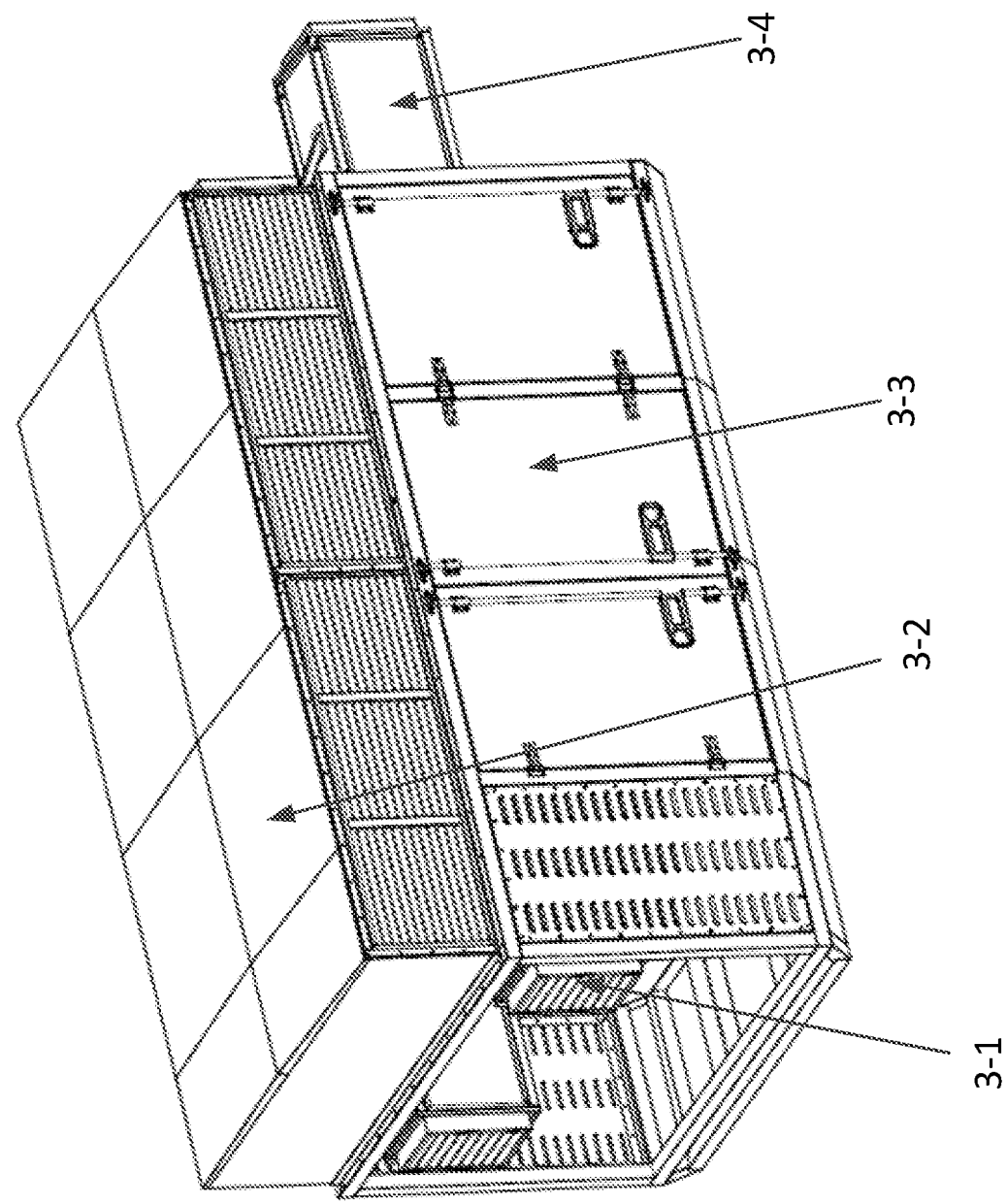
FIG. 20 is a schematic diagram of an example external structure of a soundproof cabin of a turbine engine.

According to the solution provided by the implementations above, the compartment unit for a turbine engine includes two compartments: one is for receiving a turbine engine, and the other is for air intake. The intake compartment may be provided with the filter device and the first muffler device to meet the intake air amount and cleanness of the turbine engine and reduce the intake noise at the same time. Further, the arrangement of the main compartment for receiving the turbine engine allows external air to enter the main compartment to cool down the space in the main compartment, and meanwhile the main compartment may also have the filter device and the second muffler device to meet cleanness of the air for cooling the main compartment and meanwhile reduces noise. The filter device and the first muffler device of the intake compartment can be detached conveniently. The main compartment may further be provided with the power system base therein to facilitate the removal of the turbine engine from and into the main compartment. As shown in FIGS. 19 to 20, the turbine fracturing system above (including one or more of the various driving, transmission, speed reduction and other components) may include a soundproof cabin for the turbine engine. The soundproof cabin may be sleeved on the turbine engine 3-7. The soundproof cabin may include a cabin body, an induction noise reduction unit and a ventilation noise reduction unit. The induction noise reduction unit and the ventilation noise reduction unit may be disposed on the cabin body. The surrounding of the cabin body frame may be filled with soundproof materials. The induction noise reduction unit may be used to reduce the induction noise of the turbine engine 3-7. The ventilation noise reduction unit may be used to reduce the noise of the ventilation system of the turbine engine 3-7. The soundproof materials may include but are not limited to glass fiber cotton, rock wool, polyurethane, aluminum honeycomb panels, peak type cotton, etc.

The induction noise reduction unit may include an intake filter 3-6, an intake silencer 3-5, an intake chamber 3-2 and an intake piping. The intake chamber 3-2 may be disposed on the top of the cabin body. The intake filter 3-6 may be arranged on the outer side face of the intake chamber 3-2, and the intake silencer 3-5 may be arranged on the inner side face of the intake chamber 3-2, with the position of the intake filter 3-6 corresponding to that of the intake silencer 3-5. The bottom of the intake chamber 3-2 may be provided with an air outlet, through which the intake chamber 3-2 is connected to one end of the intake piping. The other end of the intake piping may be connected to an air inlet of the turbine engine 3-7. Both the top and bottom surfaces of the intake chamber 3-2 may be filled with soundproof materials. As shown in FIG. 19, the induction noise reduction unit or the intake chamber may be configured in the power transmission of the turbine power transmission direction (or axial direction) to cover the entire length of the turbine engine and also cover the end frames (in the power transmission direction) of the cabin body, when viewed from the top. Likewise, as shown in FIG. 19, the induction noise reduction unit or the intake chamber may be configured in a direction perpendicular power transmission of the turbine power transmission direction (or axial direction) in the horizontal plane to cover the entire width of the turbine engine and also at least cover or extend over the end frames (in the direction perpendicular to the power transmission direction) of the cabin body, when viewed from the top. In other words, in a top view, the induction noise reduction unit or the intake chamber at least covers a peripheral boundary of the cabin body.

There may be no intake filters 6 and intake silencers 3-5 arranged at the exhaust end of the turbine engine 3-7. The exhaust end refers to the end at which the exhaust duct 3-10 of the turbine engine 3-7 is disposed. The side face of the intake chamber 3-2 at the side of the exhaust end can also be filled with soundproof materials.

The ventilation noise reduction unit may include an inlet air silencer 3-4, an inlet air fan and an outlet air silencer 3-1, wherein the inlet air silencer 3-4 is connected to the inlet air fan. The inlet air silencer 3-4, the inlet air fan and the outlet air silencer 3-1 may be disposed on the cabin body. The inlet air silencer 3-4 and the outlet air silencer 3-1 may be arranged on opposite sides of the cabin body.

There may be one or more sets of ventilation noise reduction units. For example, either side of the transmission direction of the turbine engine 3-7 can be provided with a set of ventilation noise reduction units. Likewise, there may be one, two or more outlet air silencers 3-1 in each set of ventilation noise reduction unit, thus better effectuating ventilation and noise reduction.

The turbine engine 3-7 may be further provided with a soundproof door 3-3 in non-transmission direction, which may be filled with soundproof materials. There may be multiple soundproof doors 3-3. The multiple soundproof doors filled with soundproof materials may be used for noise insulation of the turbine engine 3-7 in non-transmission direction, and also offer convenience for repair and daily maintenance.

In FIGS. 19 and 20, the air used for combustion in the turbine engine 3-7 is fed through the intake filter 3-6, enters the intake chamber 3-2 through the intake silencer 3-5, and then enters the air inlet of the turbine engine 3-7 through the intake piping.

The air used for ventilation and cooling in the turbine engine 3-7 may be fed, under the action of the inlet air fan, into the soundproof cabin of the engine through the inlet air silencer 3-4, and then discharged to the outside of the soundproof cabin of the engine through the outlet air silencer 3-1.

It should be noted that the terms "first", "second", etc., in the description and claims of the disclosure and in the accompanying drawings, are used to distinguish between similar objects and not necessarily to describe a particular order or sequential order. It should be understood that data used in this way can be interchanged under appropriate circumstances, such that the embodiments of the disclosure described herein are implemented in a sequence other than those illustrated or described herein. Moreover, the terms "include" and "have" as well as any variations thereof are intended to mean covered and non-exclusive inclusion, for example, a process, a method, a system, a product or equipment including a series of steps or units are not required to be limited by those explicitly listed, but can include other steps or units not explicitly listed or inherent to these processes, methods, products or equipment.

For ease of description, spatial relative terms such as "over", "above", "on an upper surface" and "on" are used herein to describe spatial positional relations of one device or feature with other devices or features as shown in the figures. It should be understood that the spatial relative terms are intended to include different orientations in use or operation in addition to the orientations of the devices described in the figures. For example, if the device in the accompanying drawings is inverted, the device described as "above" or "over" other devices or structures would then be positioned "below" or "under" the other devices or structures. Thus, the illustrative term "above" includes two orientations of "above" and "below". The device can also be positioned in other different ways (being rotated by 90 degrees or being positioned at other orientations) and the spatial relative description used herein is interpreted accordingly.

What is described above is only as preferred embodiments of the disclosure and is not intended to limit the disclosure, and for those skilled in the art, the disclosure is variously modified and changed. Any modifications, equivalent replacements, improvements, etc. made within the spirit and principle of the disclosure should fall within the protection scope of the disclosure.

What is claimed is:

1. A system comprising:
a first step structure disposed on a first workpiece;
a second step structure disposed on a second workpiece, wherein a first step end surface of the first step structure and a second step end surface of the second step structure are positioned on a same plane;
a connecting structure, being configured to connect the first workpiece and the second workpiece and comprising:
a first connecting assembly disposed on the first workpiece;
a second connecting assembly disposed on the second workpiece, wherein the second connecting assembly comprises a second connecting member and a fixing assembly, the second connecting member is movably disposed, so as to connect the second connecting member and the first connecting assembly, wherein the fixing assembly is connected with the second connecting member, and the fixing assembly is movably disposed relative to the second connecting member;
a locking portion, wherein at least part of the locking portion is disposed on the second workpiece, and the fixing assembly is connected with the locking portion; and
a loading assembly disposed on the second step end surface, wherein the loading assembly is movably disposed in a direction close to or away from the first workpiece, and at least part of the loading assembly is in lap joint with the second step end surface.

2. The system in claim 1, wherein the loading assembly comprises:
a sleeve disposed on the second step end surface, wherein an opening is provided on a wall of the sleeve;
a loading pin penetrating the sleeve and moving relative to the sleeve, wherein at least part of the loading pin is in lap joint with the second step end surface; and
a limiting rod, wherein at least part of the limiting rod penetrates the opening to be connected with the loading pin, and the limiting rod is configured to drive the loading pin to move.

3. The system in claim 1, wherein:
the second connecting member is rotatably disposed around a first predetermined axis;
the fixing assembly is rotatably disposed around a second predetermined axis relative to the second connecting member; and
the first predetermined axis and the second predetermined axis are staggered.

4. The system in claim 3, wherein:
the first connecting assembly comprises a connecting plate;
a hook portion is disposed on the connecting plate;
the second connecting member comprises a hanging ring;
the hanging ring is connected with the fixing assembly;
the fixing assembly is configured to drive the hanging ring to move in a direction towards the first workpiece;
the hanging ring is rotatably disposed around the first predetermined axis; and
at least part of the hanging ring is connectable to the hook portion.

5. The system in claim 4, wherein the second connecting assembly further comprises:
a fixed seat, wherein a protruding plate is disposed on the fixed seat, and the fixing assembly is hinged to the protruding plate; and
a rotatable shaft, wherein:
the rotatable shaft is connected with the hanging ring;
the rotatable shaft is connected with the fixing assembly;
the fixing assembly drives the hanging ring to move by means of the rotatable shaft; and
the hanging ring rotates around an axis of the rotatable shaft.

6. The system in claim 5, wherein a first hinge point is provided on the protruding plate, and the first hinge point is closer to the connecting plate relative to the axis of the rotatable shaft.

7. The system in claim 5, wherein:
the locking portion comprises a clamping plate;
the clamping plate is disposed on the fixed seat;
the clamping plate extends from the fixed seat in a direction away from the first workpiece; and the fixing assembly comprises:
a rotatable handle hinged to the protruding plate and connected with the hanging ring, wherein the rotatable handle is configured to drive the hanging ring to move; and
a locking handle, wherein the locking handle is hinged to the rotatable handle, a clamping groove is provided on the locking handle, and the locking handle is connected with the clamping plate in a clamped manner using the clamping groove.

8. The system in claim 7, wherein the second connecting assembly further comprises:
a hinge shaft, wherein the hinge shaft sequentially penetrates the rotatable handle and the locking handle, and wherein the locking handle rotates around the hinge shaft; and
a torsion spring sleeving the hinge shaft and positioned between the rotatable handle and the locking handle, wherein two ends of the torsion spring are connected with the rotatable handle and the locking handle respectively.

* * * * *